(12) United States Patent
Abe

(10) Patent No.: US 8,649,197 B2
(45) Date of Patent: Feb. 11, 2014

(54) MULTILEVEL INVERTER

(75) Inventor: Kazuya Abe, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 323 days.

(21) Appl. No.: 13/158,537

(22) Filed: Jun. 13, 2011

(65) Prior Publication Data

US 2012/0057380 A1 Mar. 8, 2012

(30) Foreign Application Priority Data

Sep. 7, 2010 (JP) ................................. 2010-199961

(51) Int. Cl.
*H02M 3/24* (2006.01)

(52) U.S. Cl.
USPC ............................................ 363/98; 363/132

(58) Field of Classification Search
USPC ............. 363/16–19, 56.03, 56.12, 65–67, 71, 363/95, 97, 131, 132, 141; 318/800–810
See application file for complete search history.

(56) References Cited

U.S. PATENT DOCUMENTS

| | | | |
|---|---|---|---|
| 4,670,828 A | | 6/1987 | Shekhawat et al. |
| 5,184,291 A | * | 2/1993 | Crowe et al. ..................... 363/37 |
| 5,506,765 A | * | 4/1996 | Nakata et al. ..................... 363/98 |
| 5,517,401 A | * | 5/1996 | Kinoshita et al. ............... 363/98 |
| 5,627,742 A | * | 5/1997 | Nakata et al. ..................... 363/98 |
| 5,910,892 A | * | 6/1999 | Lyons et al. ..................... 363/98 |
| 6,005,787 A | * | 12/1999 | Mizukoshi ....................... 363/71 |

FOREIGN PATENT DOCUMENTS

| | | | |
|---|---|---|---|
| JP | 63-502953 A | | 10/1988 |
| JP | 5-308778 A | | 11/1993 |
| JP | 8-182342 A | | 7/1996 |
| JP | 11-220886 A | | 8/1999 |
| JP | 2006-87257 A | | 3/2006 |
| JP | 2009-17622 | * | 1/2009 |
| JP | 2009-17622 A | | 1/2009 |
| JP | 2009-95075 A | | 4/2009 |
| JP | 2012-34428 | * | 2/2012 |
| JP | 2012-34428 A | | 2/2012 |

* cited by examiner

*Primary Examiner* — Rajnikant Patel
(74) *Attorney, Agent, or Firm* — Birch, Stewart, Kolasch & Birch, LLP

(57) ABSTRACT

A multilevel inverter includes an inverter arm. The inverter arm is provided between a highest electric potential point and a lowest electric potential point, and includes (i) a second switching element group to which switching elements that are connected in series belong, the switching elements being connected to respective diodes which are connected in an opposite polarity and in parallel and (ii) a diode for each power supply connection point. One of connection points at which the switching elements belonging to the second switching element group are connected to each other and a U phase output terminal are connected, the one connection point being located such that at least one of the switching elements provided between the one connection point and the highest electric potential point is equal in number to the other switching elements which belong to the second switching element group and are provided between the one connection point and the lowest electric potential point.

6 Claims, 28 Drawing Sheets

US 8,649,197 B2

MULTILEVEL INVERTER

This Nonprovisional application claims priority under 35 U.S.C. §119(a) on Patent Application No. 2010-199961 filed in Japan on Sep. 7, 2010, the entire contents of which are hereby incorporated by reference.

TECHNICAL FIELD

The present invention relates to a multilevel inverter.

BACKGROUND ART

Various multilevel inverters including what is described in Patent Literature 1 have been suggested. FIG. 25 is a circuit diagram illustrating a configuration of one phase (referred to as a U phase) of a conventional single phase three level inverter.

Members indicated by reference numerals 101 and 102 are direct current power supplies. The direct current power supply 101 has a positive terminal which is connected to a direct current voltage terminal 101a and a negative terminal which is connected to a direct current voltage terminal 102a. The direct current power supply 101 applies a voltage of ½ V between the direct current voltage terminal 101a and the direct current voltage terminal 102a. The direct current power supply 102 has a positive terminal which is connected to the direct current voltage terminal 102a and a negative terminal which is connected to a direct current voltage terminal 103a. The direct current power supply 102 applies a voltage of ½ V between the direct current voltage terminal 102a and the direct current voltage terminal 103a. This causes the direct current voltage terminals 101a through 103a to have respective different direct current voltages.

An inverter arm 131 is provided between the direct current voltage terminals 101a through 103a and a U phase output terminal 106. The inverter arm 131 includes switching elements 111a through 114a which are connected in series and diodes 111b through 114b which are connected to the respective switching elements 111a through 114a in an opposite polarity and in parallel. The inverter arm 131 further includes a diode 121 whose anode is connected to the direct current voltage terminal 102a which is a direct current voltage dividing point and a diode 122 whose cathode is connected to the direct current voltage dividing point. The inverter arm 131 selectively carries out PWM (Pulse Width Modulation) control with respect to the switching elements 111a through 114a, so that a U phase voltage is outputted via the U phase output terminal 106.

Note that the diodes 111b through 114b thus connected in an opposite polarity and in parallel turn on when there is a phase difference between a line voltage $v_{uw}$ and an output current $i_o$.

FIG. 26 is a circuit diagram illustrating a configuration of the other phase (referred to as a W phase) of the conventional single phase three level inverter. The direct current power supplies 101 and 102 are shared by the U phase and the W phase. An inverter arm 132 is provided between the direct current voltage terminals 101a through 103a and a W phase output terminal 107. As in the case of the inverter arm 131 of U phase, the inverter arm 132 includes switching elements 115a through 118a which are connected in series and diodes 115b through 118b which are connected to the respective switching elements 115a through 118a in an opposite polarity and in parallel. The inverter arm 132 further includes a diode 123 whose anode is connected to the direct current voltage terminal 102a which is the direct current voltage dividing point and a diode 124 whose cathode is connected to the direct current voltage dividing point. The inverter arm 132 selectively carries out PWM control with respect to the switching elements 115a through 118a, so that a W phase voltage is outputted via the W phase output terminal 107.

FIG. 27 is a circuit diagram illustrating the conventional single phase three level inverter. The conventional single phase three level inverter of FIG. 27 is configured by combining the U phase circuit of FIG. 25 and the W phase circuit of FIG. 26.

The single phase three level inverter of FIG. 27 is arranged such that the line voltage $v_{uw}$ which is a voltage of a difference between the U phase voltage outputted via the U phase output terminal 106 and the W phase voltage outputted via the W phase output terminal 107 is supplied to a load which is connected between the U phase output terminal 106 and the W phase output terminal 107.

$i_o$ in FIG. 27 refers to an output current. A waveform chart of FIG. 28 illustrates a waveform of the line voltage $v_{uw}$ for one (1) period. Circuit diagrams of FIGS. 29 through 32 illustrate states in which switching elements turn on/off.

The following description specifically discusses FIGS. 29 through 32. FIG. 29 is the circuit diagram illustrating the state in which the switching elements turn on/off during time periods (i) from t1 to t2 and (ii) from t3 to t4 in FIG. 28 in a case where the output current $i_o$ is positive in the circuit of FIG. 27. FIG. 30 is the circuit diagram illustrating the state in which the switching elements turn on/off during a time period from t2 to t3 in FIG. 28 in the case where the output current $i_o$ is positive in the circuit of FIG. 27. FIG. 31 is the circuit diagram illustrating the state in which the switching elements turn on/off during time periods (i) from t4 to t5 and (ii) from t6 to t7 in FIG. 28 in a case where the output current $i_o$ is negative in the circuit of FIG. 27. FIG. 32 is the circuit diagram illustrating the state in which the switching elements turn on/off during a time period from t5 to t6 in FIG. 28 in the case where the output current $i_o$ is negative in the circuit of FIG. 27.

Note that FIGS. 29 through 32 illustrate the states in which the switching elements turn on/off in a utility interactive inverter to which a load in which the line voltage $v_{uw}$ and the output current $i_o$ are in phase with each other is connected.

The following description discusses how the conventional single phase three level inverter operates.

First, during a time period from t1 to t4 in FIG. 28, the inverter arm 131 of U phase causes the switching element 112a to turn on and the switching element 114a to turn off. The inverter arm 131 carries out PWM control with respect to the switching elements 111a and 113a such that the switching elements 111a and 113a have opposite polarities.

In contrast, the inverter arm 132 of W phase causes the switching element 115a to turn off and the switching element 117a to turn on. The inverter arm 132 carries out PWM control with respect to the switching elements 116a and 118a such that the switching elements 116a and 118a have opposite polarities.

Such switching control causes the state illustrated in FIG. 29 to repeatedly occur during the time periods (i) from t1 to t2 and (ii) from t3 to t4. Such switching control also causes the state illustrated in FIG. 30 to repeatedly occur during the time period from t2 to t3. Accordingly, the line voltage $v_{uw}$ has a waveform shown in the time period from t1 to t4 in FIG. 28.

Next, during a time period from t4 to t7 in FIG. 28, the inverter arm 131 of U phase causes the switching element 111a to turn off and the switching element 113a to turn on. The inverter arm 131 carries out PWM control with respect to the switching elements 112a and 114a such that the switching elements 112a and 114a have opposite polarities.

In contrast, the inverter arm 132 of W phase causes the switching element 116a to turn on and the switching element 118a to turn off. The inverter arm 132 carries out PWM control with respect to the switching elements 115a and 117a such that the switching elements 115a and 117a have opposite polarities.

Such switching control causes the state illustrated in FIG. 31 to repeatedly occur during the time periods (i) from t4 to t5 and (ii) from t6 to t7. Such switching control also causes the state illustrated in FIG. 32 to repeatedly occur during the time period from t5 to t6. Accordingly, the line voltage $v_{uw}$ has a waveform shown in the time period from t4 to t7 in FIG. 28.

The conventional single phase three level inverter of FIG. 27 thus controls one (1) period from t1 to t7. When finishing control of the one period, the conventional single phase three level inverter restarts controlling the one period at t1.

Conventional multilevel inverter-related examples include not only the multilevel inverter of Patent Literature 1 and the conventional single phase three level inverter of FIG. 27 but also a multilevel power inverter which is disclosed in Patent Literature 2 and whose neutral point is clamped. Patent Literature 3 discloses a bidirectional switch used in an inverter whose neutral point is clamped.

CITATION LIST

Patent Literature 1
Japanese Patent Application Publication, Tokukaihei, No. 5-308778 A (Publication Date: Nov. 19, 1993)
Patent Literature 2
Japanese Patent Application Publication, Tokukaihei, No. 11-220886 A (Publication Date: Aug. 10, 1999)
Patent Literature 3
Japanese Translation of PCT International Application, Tokuhyosho, No. 63-502953 A (Publication Date: Oct. 27, 1988)

SUMMARY OF INVENTION

Technical Problem

The conventional single phase three level inverter of FIG. 27 (a conventional multilevel inverter) requires changing, to multi levels, the U phase voltage outputted via the U phase output terminal 106 and the W phase voltage outputted via the W phase output terminal 107. This causes a problem of an increase in number of switching elements and diodes.

Further, another problem occurs such that it is necessary to provide, as many as gate-source pairs of respective switching elements, floating power supplies for driving the respective switching elements.

The present invention has been made in view of the conventional problems, and an object of the present invention is to provide a multilevel inverter in which at least one of (i) the number of switching elements, (ii) the number of diodes, and (iii) the number of floating power supplies has been reduced as compared to a conventional multilevel inverter.

Solution to Problem

In order to attain the object, a multilevel inverter of the present invention includes: a plurality of direct current power supplies which are connected in series; a first output terminal and a second output terminal which output an alternating current voltage; a first inverter arm which supplies, to the first output terminal, either one of (i) a direct current voltage applied to a highest electric potential point in the plurality of direct current power supplies and (ii) a direct current voltage applied to a lowest electric potential point in the plurality of direct current power supplies; and a second inverter arm which supplies, to the second output terminal, any one of (i) the direct current voltage applied to the highest electric potential point, (ii) the direct current voltage applied to the lowest electric potential point, and (iii) a direct current voltage applied to each power supply connection point at which the plurality of direct current power supplies that are adjacent to each other are connected, the first inverter arm including a first switching element group to which two switching elements belong, the two switching elements being (i) connected in series, (ii) provided between the highest electric potential point and the lowest electric potential point, and (iii) connected to respective diodes which are connected in an opposite polarity and in parallel, (i) a connection point at which the two switching elements belonging to the first switching element group are connected and (ii) the first output terminal being connected, the second inverter arm including a second switching element group to which even-numbered switching elements belong, the even-numbered switching elements being (i) connected in series, (ii) provided between the highest electric potential point and the lowest electric potential point, and (iii) connected to respective diodes which are connected in an opposite polarity and in parallel, the second inverter arm further including a first diode and a second diode for the each power supply connection point, the first diode having (i) an anode which is connected to the each power supply connection point and (ii) a cathode which is connected to the highest electric potential point via at least one of the even-numbered switching elements belonging to the second switching element group, the at least one switching element being equal in number to at least one of the plurality of direct current power supplies, the at least one direct current power supply being provided between the highest electric potential point and the each power supply connection point, the second diode having (i) a cathode which is connected to the each power supply connection point and (ii) an anode which is connected to the lowest electric potential point via the other switching elements which belong to the second switching element group and are equal in number to the other direct current power supplies, the other direct current power supplies being provided between the lowest electric potential point and the each power supply connection point, (i) the second output terminal and (ii) one of connection points at which the even-numbered switching elements belonging to the second switching element group are connected to each other being connected, the one connection point being located such that at least one of the even-numbered switching elements provided between the one connection point and the highest electric potential point is equal in number to the other switching elements which belong to the second switching element group and are provided between the one connection point and the lowest electric potential point.

According to the invention, in a case where the switching elements of the second inverter arm are suitably controlled to turn on/off, any one of (i) the direct current voltage applied to the highest electric potential point, (ii) the direct current voltage applied to the lowest electric potential point, and (iii) the direct current voltage applied to the each of the power supply connection points can be supplied to the second output terminal. In a case where the switching elements of the first inverter arm are suitably controlled to turn on/off, either one of the direct current voltage applied to the highest electric potential point and (ii) the direct current voltage applied to the lowest electric potential point can be supplied to the first output terminal. This allows the alternating current voltage to be outputted.

For example, in a case where a positive output current is outputted via the second output terminal and the second output terminal has its highest electric voltage when a voltage of the first output terminal is a reference voltage, it is only necessary that (i) all the switching elements provided between the highest electric potential point and the second output terminal turn on and (ii) the switching element provided between the lowest electric potential point and the first output terminal turn on.

Alternatively, for example, in a case where a negative output current is outputted via the second output terminal and the second output terminal has its highest voltage when a voltage of the first output terminal is a reference voltage, it is only necessary that (i) both the switching elements belonging to the first switching element group turn off and (ii) all the switching elements belonging to the second switching element group turn off. In this case, a current is supplied to each of (i) the diode which is provided between the lowest electric potential point and the first output terminal and connected to a corresponding switching element in an opposite polarity and in parallel and (ii) the diodes which are provided between the highest electric potential point and the second output terminal and connected to respective switching elements in an opposite polarity and in parallel. This allows the negative output current to be outputted via the second output terminal.

The first inverter arm has been obtained by simplifying the inverter arm which is provided in the conventional single phase three level inverter described in Background Art and has four switching elements and six diodes. Therefore, two switching elements and four diodes have been reduced in the first inverter arm as compared to the conventional single phase three level inverter. Further, since two switching elements have been reduced as described above, two floating power supplies can be accordingly reduced.

This makes it possible to provide a multilevel inverter in which at least one of (i) the number of switching elements, (ii) the number of diodes, and (iii) the number of floating power supplies has been reduced as compared to a conventional multilevel inverter.

In order to attain the object, a multilevel inverter of the present invention includes: a plurality of direct current power supplies which are connected in series; a first output terminal and a second output terminal which output an alternating current voltage; a first inverter arm which supplies, to the first output terminal, any one of (i) a direct current voltage applied to a highest electric potential point in the plurality of direct current power supplies, (ii) a direct current voltage applied to a lowest electric potential point in the plurality of direct current power supplies, and (iii) a direct current voltage applied to each power supply connection point at which the plurality of direct current power supplies that are adjacent to each other are connected; and a second inverter arm which supplies, to the second output terminal, any one of (i) the direct current voltage applied to the highest electric potential point, (ii) the direct current voltage applied to the lowest electric potential point, and (iii) the direct current voltage applied to the each power supply connection point, the first inverter arm including a first switching element group to which odd-numbered switching elements belong, the odd-numbered switching elements being (i) connected in series, (ii) provided between the highest electric potential point and the lowest electric potential point, and (iii) connected to respective diodes which are connected in an opposite polarity and in parallel, the first inverter arm further including a first switching element and a first diode for the each power supply connection point, the first switching element having (i) one end which is connected to the each power supply connection point and (ii) the other end which is connected to the highest electric potential point via at least one of the odd-numbered switching elements belonging to the first switching element group, the at least one switching element being equal in number to at least one of the plurality of direct current power supplies, the at least one direct current power supply being provided between the highest electric potential point and the each power supply connection point, the first diode having (i) a cathode which is connected to the each power supply connection point and (ii) an anode which is connected to the lowest electric potential point via the other switching elements which belong to the first switching element group and are equal in number to the other direct current power supplies, the other direct current power supplies being provided between the lowest electric potential point and the each power supply connection point, (i) the first output terminal and (ii) one of connection points at which the odd-numbered switching elements belonging to the first switching element group are connected to each other being connected, the one connection point being located such that at least one of the odd-numbered switching elements provided between the one connection point and the highest electric potential point is smaller in number by one than the other switching elements which belong to the first switching element group and are provided between the one connection point and the lowest electric potential point, the second inverter arm including a second switching element group to which odd-numbered switching elements belong, the odd-numbered switching elements being (i) connected in series, (ii) provided between the highest electric potential point and the lowest electric potential point, and (iii) connected to respective diodes which are connected in an opposite polarity and in parallel, the second inverter arm further including a second switching element and a second diode for the each power supply connection point, the second switching element having (i) one end which is connected to the each power supply connection point and (ii) the other end which is connected to the highest electric potential point via at least one of the odd-numbered switching elements belonging to the second switching element group, the at least one switching element being equal in number to at least one of the plurality of direct current power supplies, the at least one direct current power supply being provided between the highest electric potential point and the each power supply connection point, the second diode having (i) a cathode which is connected to the each power supply connection point and (ii) an anode which is connected to the lowest electric potential point via the other switching elements which belong to the second switching element group and are equal in number to the other direct current power supplies, the other direct current power supplies being provided between the lowest electric potential point and the each power supply connection point, (i) the second output terminal and (ii) one of connection points at which the odd-numbered switching elements belonging to the second switching element group are connected to each other being connected, the one connection point being located such that at least one of the odd-numbered switching elements provided between the one connection point and the highest electric potential point is smaller in number by one than the other switching elements which belong to the second switching element group and are provided between the one connection point and the lowest electric potential point.

According to the invention, in a case where the switching elements of the second inverter arm are suitably controlled to turn on/off, any one of (i) the direct current voltage applied to the highest electric potential point, (ii) the direct current voltage applied to the lowest electric potential point, and (iii) the direct current voltage applied to the each of the power supply connection points can be supplied to the second output terminal. In a case where the switching elements of the first inverter arm are suitably controlled to turn on/off, any one of (i) the direct current voltage applied to the highest electric potential point, (ii) the direct current voltage applied to the lowest electric potential point, and (iii) the direct current voltage applied to the each of the power supply connection points can be supplied to the first output terminal. This allows the alternating current voltage to be outputted.

For example, in a case where a negative output current is outputted via the second output terminal and the second output terminal has its lowest voltage when a voltage of the first output terminal is a reference voltage, it is only necessary that (i) all the switching elements provided between the highest electric potential point and the first output terminal turn on and (ii) all the switching elements provided between the lowest electric potential point and the second output terminal turn on.

Alternatively, for example, in a case where a positive output current is outputted via the second output terminal and the second output terminal has its lowest voltage when a voltage of the first output terminal is a reference voltage, it is only necessary that (i) all the switching elements provided in the second inverter arm turn off and (ii) all the switching elements provided in the first inverter arm turn off. In this case, a current is supplied to each of (i) the diodes which are provided between the lowest electric potential point and the second output terminal and connected to respective switching elements in an opposite polarity and in parallel and (ii) the diodes which are provided between the highest electric potential point and the first output terminal and connected to respective switching elements in an opposite polarity and in parallel. This allows the positive output current to be outputted via the second output terminal.

Four diodes have been reduced in the multilevel inverter, especially a three level inverter, as compared to the conventional single phase three level inverter. Though no switching elements have been reduced, sources of respective of (i) the third switching element and the fourth switching element and (ii) a switching element which belongs to the first switching element group and one end of which is connected to the highest electric potential point and a switching element which belongs to the second switching element group and one end of which is connected to the highest electric potential point can be shared in a case where (i) and (ii) are MOSFETs. This allows two floating power supply systems to be reduced.

This makes it possible to provide a multilevel inverter in which at least one of (i) the number of switching elements, (ii) the number of diodes, and (iii) the number of floating power supplies has been reduced as compared to a conventional multilevel inverter.

In order to attain the object, a multilevel inverter of the present invention includes: a plurality of direct current power supplies which are connected in series; a first output terminal and a second output terminal which output an alternating current voltage; a first inverter arm which supplies, to the first output terminal, any one of (i) a direct current voltage applied to a highest electric potential point in the plurality of direct current power supplies, (ii) a direct current voltage applied to a lowest electric potential point in the plurality of direct current power supplies, and (iii) a direct current voltage applied to each power supply connection point at which the plurality of direct current power supplies that are adjacent to each other are connected; and a second inverter arm which supplies, to the second output terminal, any one of (i) the direct current voltage applied to the highest electric potential point, (ii) the direct current voltage applied to the lowest electric potential point, and (iii) the direct current voltage applied to the each power supply connection point, the first inverter arm including a first switching element group to which odd-numbered switching elements belong, the odd-numbered switching elements being (i) connected in series, (ii) provided between the highest electric potential point and the lowest electric potential point, and (iii) connected to respective diodes which are connected in an opposite polarity and in parallel, the first inverter arm further including a first diode and a first switching element for the each power supply connection point, the first diode having (i) an anode which is connected to the each power supply connection point and (ii) a cathode which is connected to the highest electric potential point via at least one of the odd-numbered switching elements belonging to the first switching element group, the at least one switching element being equal in number to at least one of the plurality of direct current power supplies, the at least one direct current power supply being provided between the highest electric potential point and the each power supply connection point, the first switching element having (i) one end which is connected to the each power supply connection point and (ii) the other end which is connected to the lowest electric potential point via the other switching elements which belong to the first switching element group and are equal in number to the other direct current power supplies, the other direct current power supplies being provided between the lowest electric potential point and the each power supply connection point, (i) the first output terminal and (ii) one of connection points at which the odd-numbered switching elements belonging to the first switching element group are connected to each other being connected, the one connection point being located such that at least one of the odd-numbered switching elements provided between the one connection point and the highest electric potential point is larger in number by one than the other switching elements which belong to the first switching element group and are provided between the one connection point and the lowest electric potential point, the second inverter arm including a second switching element group to which odd-numbered switching elements belong, the odd-numbered switching elements being (i) connected in series, (ii) provided between the highest electric potential point and the lowest electric potential point, and (iii) connected to respective diodes which are connected in an opposite polarity and in parallel, the second inverter arm further including a second diode and a second switching element for the each power supply connection point, the second diode having (i) an anode which is connected to the each power supply connection point and (ii) a cathode which is connected to the highest electric potential point via at least one of the odd-numbered switching elements belonging to the second switching element group, the at least one switching element being equal in number to at least one of the plurality of direct current power supplies, the at least one direct current power supply being provided between the highest electric potential point and the each power supply connection point, the second switching element having (i) one end which is connected to the each power supply connection point and (ii) the other end which is connected to the lowest electric potential point via the other switching elements which belong to the second switching element group and are equal in number to the other direct current power supplies, the other direct current power supplies being provided between the lowest electric potential point and the each power supply connection point, (i) the second output terminal and (ii) one of connection points at which the odd-numbered switching elements belonging to the second switching element group are connected to each other being connected, the one connection point being located such that at least one of the odd-numbered switching elements provided between the one connection point and the highest electric potential point is larger in number by one than the other switching elements which belong to the second switching element group and are provided between the one connection point and the lowest electric potential point.

According to the invention, in a case where the switching elements of the second inverter arm are suitably controlled to turn on/off, any one of (i) the direct current voltage applied to the highest electric potential point, (ii) the direct current voltage applied to the lowest electric potential point, and (iii) the direct current voltage applied to the each of the power supply connection points can be supplied to the second output terminal. In a case where the switching elements of the first inverter arm are suitably controlled to turn on/off, any one of (i) the direct current voltage applied to the highest electric potential point, (ii) the direct current voltage applied to the lowest electric potential point, and (iii) the direct current voltage applied to the each of the power supply connection points can be supplied to the first output terminal. This allows the alternating current voltage to be outputted.

For example, in a case where a negative output current is outputted via the second output terminal and the second output terminal has its lowest voltage when a voltage of the first output terminal is a reference voltage, it is only necessary that (i) all the switching elements provided between the highest electric potential point and the first output terminal turn on and (ii) all the switching elements provided between the lowest electric potential point and the second output terminal turn on.

Alternatively, for example, in a case where a negative output current is outputted via the second output terminal and the second output terminal has its highest voltage when a voltage of the first output terminal is a reference voltage, it is only necessary that (i) all the switching elements provided in the first inverter arm turn off and (ii) all the switching elements provided in the second inverter arm turn off. In this case, a current is supplied to each of (i) the diodes which are provided between the lowest electric potential point and the first output terminal and connected to respective switching elements in an opposite polarity and in parallel and (ii) the diodes which are provided between the highest electric potential point and the second output terminal and connected to respective switching elements in an opposite polarity and in parallel. This allows the negative output current to be outputted via the second output terminal.

Four diodes have been reduced in the multilevel inverter, especially a three level inverter, as compared to the conventional single phase three level inverter.

This makes it possible to provide a multilevel inverter in which at least one of (i) the number of switching elements, (ii) the number of diodes, and (iii) the number of floating power supplies has been reduced as compared to a conventional multilevel inverter.

Advantageous Effects of Invention

As described earlier, the multilevel inverter of the present invention is arranged to include the first inverter arm including a first switching element group to which two switching elements belong, the two switching elements being (i) connected in series, (ii) provided between the highest electric potential point and the lowest electric potential point, and (iii) connected to respective diodes which are connected in an opposite polarity and in parallel, (i) a connection point at which the two switching elements belonging to the first switching element group are connected and (ii) the first output terminal being connected, the second inverter arm including a second switching element group to which even-numbered switching elements belong, the even-numbered switching elements being (i) connected in series, (ii) provided between the highest electric potential point and the lowest electric potential point, and (iii) connected to respective diodes which are connected in an opposite polarity and in parallel, the second inverter arm further including a first diode and a second diode for the each power supply connection point, the first diode having (i) an anode which is connected to the each power supply connection point and (ii) a cathode which is connected to the highest electric potential point via at least one of the even-numbered switching elements belonging to the second switching element group, the at least one switching element being equal in number to at least one of the plurality of direct current power supplies, the at least one direct current power supply being provided between the highest electric potential point and the each power supply connection point, the second diode having (i) a cathode which is connected to the each power supply connection point and (ii) an anode which is connected to the lowest electric potential point via the other switching elements which belong to the second switching element group and are equal in number to the other direct current power supplies, the other direct current power supplies being provided between the lowest electric potential point and the each power supply connection point, (i) the second output terminal and (ii) one of connection points at which the even-numbered switching elements belonging to the second switching element group are connected to each other being connected, the one connection point being located such that at least one of the even-numbered switching elements provided between the one connection point and the highest electric potential point is equal in number to the other switching elements which belong to the second switching element group and are provided between the one connection point and the lowest electric potential point.

As described earlier, the multilevel inverter of the present invention is arranged to include the first inverter arm including a first switching element group to which odd-numbered switching elements belong, the odd-numbered switching elements being (i) connected in series, (ii) provided between the highest electric potential point and the lowest electric potential point, and (iii) connected to respective diodes which are connected in an opposite polarity and in parallel, the first inverter arm further including a first switching element and a first diode for the each power supply connection point, the first switching element having (i) one end which is connected to the each power supply connection point and (ii) the other end which is connected to the highest electric potential point via at least one of the odd-numbered switching elements belonging to the first switching element group, the at least one switching element being equal in number to at least one of the plurality of direct current power supplies, the at least one direct current power supply being provided between the highest electric potential point and the each power supply connection point, the first diode having (i) a cathode which is connected to the each power supply connection point and (ii) an anode which is connected to the lowest electric potential point via the other switching elements which belong to the first switching element group and are equal in number to the other direct current power supplies, the other direct current power supplies being provided between the lowest electric potential point and the each power supply connection point, (i) the first output terminal and (ii) one of connection points at which the odd-numbered switching elements belonging to the first switching element group are connected to each other being connected, the one connection point being located such that at least one of the odd-numbered switching elements provided between the one connection point and the highest electric potential point is smaller in number by one than the other switching elements which belong to the first switching element group and are provided between the one connection point and the lowest electric potential point, the second inverter arm including a second switching element group to which odd-numbered switching elements belong, the odd-numbered switching elements being (i) connected in series, (ii) provided between the highest electric potential point and the lowest electric potential point, and (iii) connected to respective diodes which are connected in an opposite polarity and in parallel, the second inverter arm further including a second switching element and a second diode for the each power supply connection point, the second switching element having (i) one end which is connected to the each power supply connection point and (ii) the other end which is connected to the highest electric potential point via at least one of the odd-numbered switching elements belonging to the second switching element group, the at least one switching element being equal in number to at least one of the plurality of direct current power supplies, the at least one direct current power supply being provided between the highest electric potential point and the each power supply connection point, the second diode having (i) a cathode which is connected to the each power supply connection point and (ii) an anode which is connected to the lowest electric potential point via the other switching elements which belong to the second switching element group and are equal in number to the other direct current power supplies, the other direct current power supplies being provided between the lowest electric potential point and the each power supply connection point, (i) the second output terminal and (ii) one of connection points at which the odd-numbered switching elements belonging to the second switching element group are connected to each other being connected, the one connection point being located such that at least one of the odd-numbered switching elements provided between the one connection point and the highest electric potential point is smaller in number by one than the other switching elements which belong to the second switching element group and are provided between the one connection point and the lowest electric potential point.

As described earlier, the multilevel inverter of the present invention is arranged to include the first inverter arm including a first switching element group to which odd-numbered switching elements belong, the odd-numbered switching elements being (i) connected in series, (ii) provided between the highest electric potential point and the lowest electric potential point, and (iii) connected to respective diodes which are connected in an opposite polarity and in parallel, the first inverter arm further including a first diode and a first switching element for the each power supply connection point, the first diode having (i) an anode which is connected to the each power supply connection point and (ii) a cathode which is connected to the highest electric potential point via at least one of the odd-numbered switching elements belonging to the first switching element group, the at least one switching element being equal in number to at least one of the plurality of direct current power supplies, the at least one direct current power supply being provided between the highest electric potential point and the each power supply connection point, the first switching element having (i) one end which is connected to the each power supply connection point and (ii) the other end which is connected to the lowest electric potential point via the other switching elements which belong to the first switching element group and are equal in number to the other direct current power supplies, the other direct current power supplies being provided between the lowest electric potential point and the each power supply connection point, (i) the first output terminal and (ii) one of connection points at which the odd-numbered switching elements belonging to the first switching element group are connected to each other being connected, the one connection point being located such that at least one of the odd-numbered switching elements provided between the one connection point and the highest electric potential point is larger in number by one than the other switching elements which belong to the first switching element group and are provided between the one connection point and the lowest electric potential point, the second inverter arm including a second switching element group to which odd-numbered switching elements belong, the odd-numbered switching elements being (i) connected in series, (ii) provided between the highest electric potential point and the lowest electric potential point, and (iii) connected to respective diodes which are connected in an opposite polarity and in parallel, the second inverter arm further including a second diode and a second switching element for the each power supply connection point, the second diode having (i) an anode which is connected to the each power supply connection point and (ii) a cathode which is connected to the highest electric potential point via at least one of the odd-numbered switching elements belonging to the second switching element group, the at least one switching element being equal in number to at least one of the plurality of direct current power supplies, the at least one direct current power supply being provided between the highest electric potential point and the each power supply connection point, the second switching element having (i) one end which is connected to the each power supply connection point and (ii) the other end which is connected to the lowest electric potential point via the other switching elements which belong to the second switching element group and are equal in number to the other direct current power supplies, the other direct current power supplies being provided between the lowest electric potential point and the each power supply connection point, (i) the second output terminal and (ii) one of connection points at which the odd-numbered switching elements belonging to the second switching element group are connected to each other being connected, the one connection point being located such that at least one of the odd-numbered switching elements provided between the one connection point and the highest electric potential point is larger in number by one than the other switching elements which belong to the second switching element group and are provided between the one connection point and the lowest electric potential point.

This brings about an effect of providing a multilevel inverter in which at least one of (i) the number of switching elements, (ii) the number of diodes, and (iii) the number of floating power supplies has been reduced as compared to a conventional multilevel inverter.

DESCRIPTION OF EMBODIMENTS

Embodiments of the present invention are described below with reference to FIGS. 1 through 24. First, a first embodiment of the present invention is to be described with reference to FIGS. 1 through 9 and 23.

First Embodiment

Figure 1:
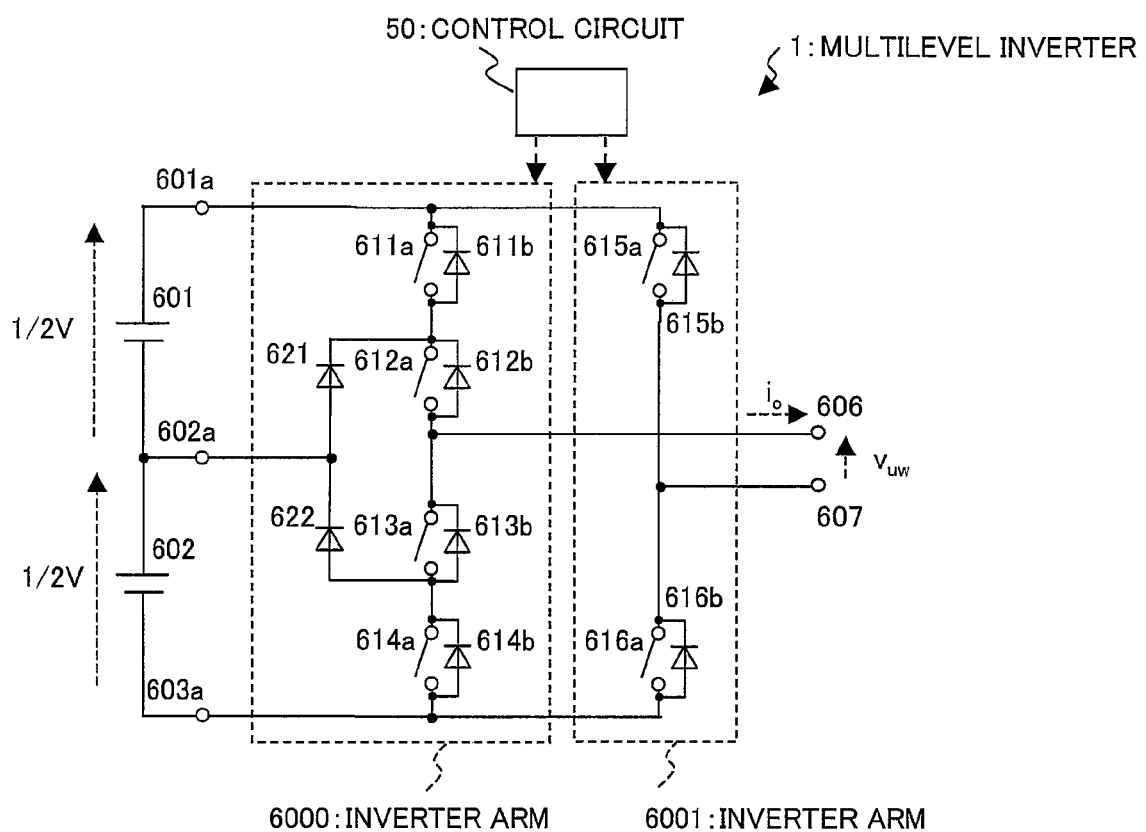
FIG. 1 is a circuit diagram of a multilevel inverter in accordance with a first embodiment of the present invention.

FIG. 1 is a circuit diagram of a multilevel inverter 1 in accordance with the first embodiment.

The multilevel inverter 1 of FIG. 1 is arranged such that a line voltage $v_{uw}$ (an alternating current voltage) which is a voltage of a difference between a U phase voltage outputted via a U phase output terminal 606 and a W phase voltage outputted via a W phase output terminal 607 is supplied to a load which is connected between the U phase output terminal 606 and the W phase output terminal 607. io in FIG. 1 indicates an output current.

The multilevel inverter 1 generally includes direct current power supplies 601 and 602 (a plurality of direct power supplies), an inverter arm 6000 (a second inverter arm), and an inverter arm 6001 (a first inverter arm).

The direct current power supply 601 has a positive terminal which is connected to a direct current voltage terminal 601a and a negative terminal which is connected to a direct current voltage terminal 602a. The direct current power supply 601 applies a voltage of ½ V between the direct current voltage terminal 601a and the direct current voltage terminal 602a. The direct current power supply 602 has a positive terminal which is connected to the direct current voltage terminal 602a and a negative terminal which is connected to a direct current voltage terminal 603a. The direct current power supply 602 applies a voltage of ½ V between the direct current voltage terminal 602a and the direct current voltage terminal 603a. This causes the direct current voltage terminals 601a through 603a to have respective different direct current voltages.

The inverter arm 6000 is provided between the direct current voltage terminals 601a through 603a and a U phase output terminal 606 (a second output terminal). The inverter arm 6000 includes switching elements 611a through 614a (even-numbered switching elements) which are connected in series and diodes 611b through 614b which are connected to the respective switching elements 611a through 614a in an opposite polarity and in parallel. The inverter arm 6000 further includes a diode 621 whose anode is connected to the direct current voltage terminal 602a which is a direct current voltage dividing point and a diode 622 whose cathode is connected to the direct current voltage dividing point. The inverter arm 6000 selects two switching elements from the switching elements 611a through 614a, so as to carry out PWM (Pulse Width Modulation) control with respect to the selected two switching elements. In addition, the inverter arm 6000 sets turning on/off of the other two switching elements, so that the U phase voltage is outputted via the U phase output terminal 606.

The inverter arm 6001 is provided between the direct current voltage terminals 601a and 603a and a W phase output terminal 607 (a first output terminal). The inverter arm 6001 includes switching elements 615a and 616a which are connected in series and diodes 615b and 616b which are connected to the respective switching elements 615a and 616a in an opposite polarity and in parallel. The inverter arm 6001 controls turning on/off of the switching elements 615a and 616a in accordance with a direction of the output current $i_o$ (whether the output current $i_o$ is positive or negative) in the multilevel inverter 1, so that the W phase voltage is outputted via the W phase output terminal 607.

In the multilevel inverter 1 of FIG. 1, the current voltage terminal 601a is connected to one end of the switching element 611a, a cathode of the diode 611b, one end of the switching element 615a, and a cathode of the diode 615b.

The other end of the switching element 611a, an anode of the diode 611b, one end of the switching element 612a, a cathode of the diode 612b, and a cathode of the diode 621 are connected to one another.

The other end of the switching element 612a, an anode of the diode 612b, one end of the switching element 613a, a cathode of the diode 613b, and the U phase output terminal 606 are connected to one another.

The other end of the switching element 615a, an anode of the diode 615b, one end of the switching element 616a, a cathode of the diode 616b, and the W phase output terminal 607 are connected to one another.

The other end of the switching element 613a, an anode of the diode 613b, one end of the switching element 614a, a cathode of the diode 614b, and an anode of the diode 622 are connected to one another.

An anode of the diode 621, a cathode of the diode 622, and the direct current voltage terminal 602a are connected to one another.

The other end of the switching element 614a, an anode of the diode 614b, the other end of the switching element 616a, an anode of the diode 616b, and the direct current voltage terminal 603a are connected to one another.

Note that a state in which a switching element and a diode are connected in an opposite polarity and in parallel refers to the following state: Assume that one end of a switch and a cathode of a diode are connected, and the other end of the switch and an anode of the diode are connected. Even in a case the switch turns on and a current flows from one end to the other end of the switch, the diode does not turn on.

The inverter arm 6001 of the multilevel inverter 1 of FIG. 1 in accordance with the first embodiment of the present invention has been obtained by simplifying the inverter arm 132 which is provided in the conventional single phase three level inverter described in Background Art and has four switching elements and six diodes. Therefore, two switching elements and four diodes have been reduced in the multilevel inverter 1 of FIG. 1 in accordance with the first embodiment of the present invention as compared to the conventional single phase three level inverter of FIG. 27. Further, since two switching elements have been reduced as described above, two floating power supplies can be accordingly reduced.

Figure 27:
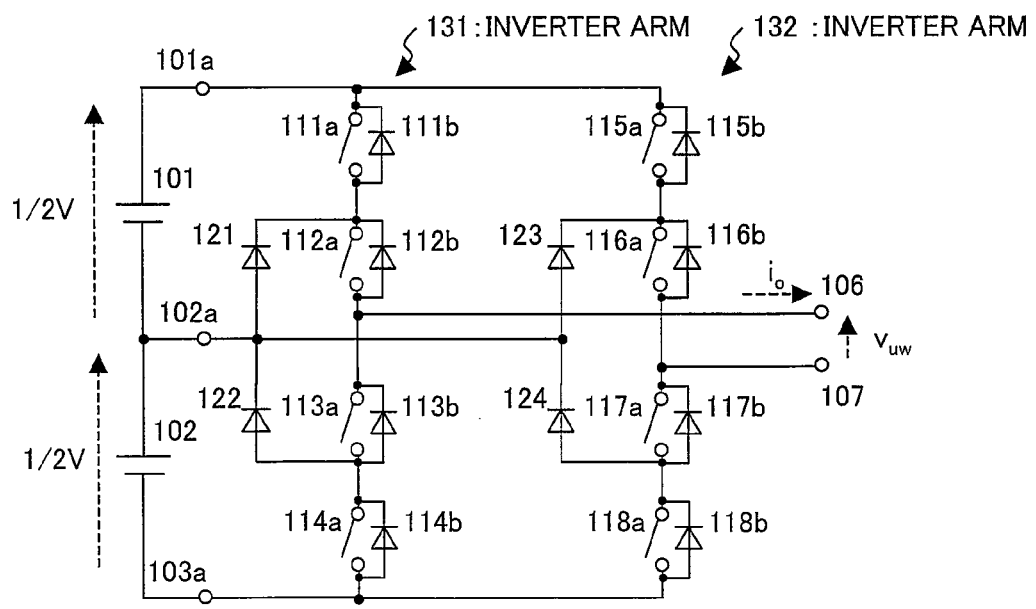
FIG. 27 is a circuit diagram illustrating the conventional single phase three level inverter.

This makes it possible to provide a multilevel (single phase three level) inverter in which at least one of (i) the number of switching elements, (ii) the number of diodes, and (iii) the number of floating power supplies has been reduced as compared to the conventional single phase three level inverter of FIG. 27.

(Load in Which Line Voltage $v_{uw}$ and Output Current $i_o$ are in Phase with Each Other)

FIGS. 2 through 5 are circuit diagrams illustrating respective states in which the switching elements of the multilevel inverter 1 of FIG. 1 turn on/off. More specifically, FIGS. 2 through 5 are circuit diagrams illustrating respective states in which the switching elements turn on/off in case of a load in which the line voltage $v_{uw}$ and the output current $i_o$ are in phase with each other (e.g., in a case where the present invention is applied to a utility interactive inverter so that the utility interactive inverter interactively operates). A waveform of the line voltage $v_{uw}$ for one (1) period is shown in the waveform chart of FIG. 28 as in the case of the conventional example.

Note that a utility interactive inverter is connected to a commercial system, which serves as a load, so as to supply alternating current power.

Figure 2:
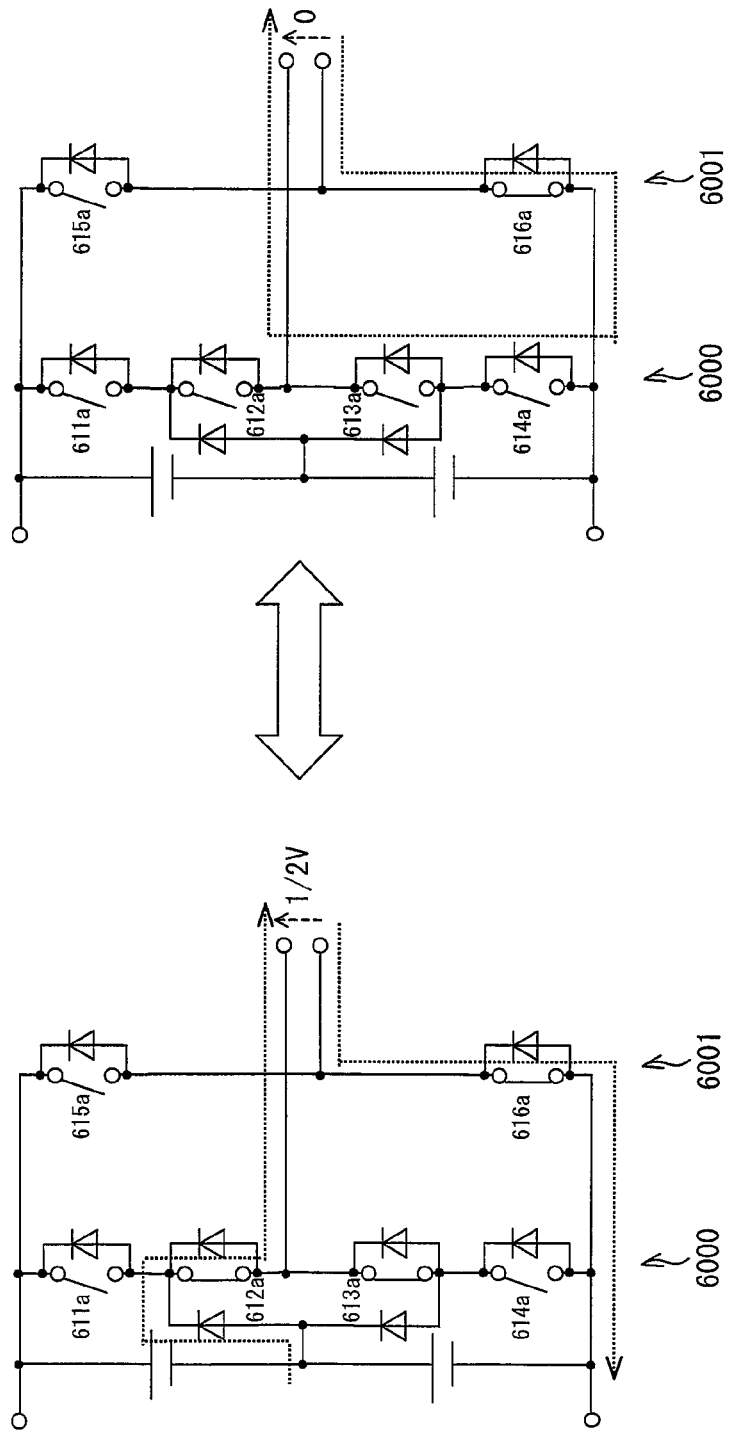
FIG. 2 is a circuit diagram illustrating a state in which switching elements turn on/off during time periods (i) from t1 to t2 and (ii) from t3 to t4 in FIG. 28 in a case where an output current $i_o$ is positive in the circuit of FIG. 1.
Figure 3:
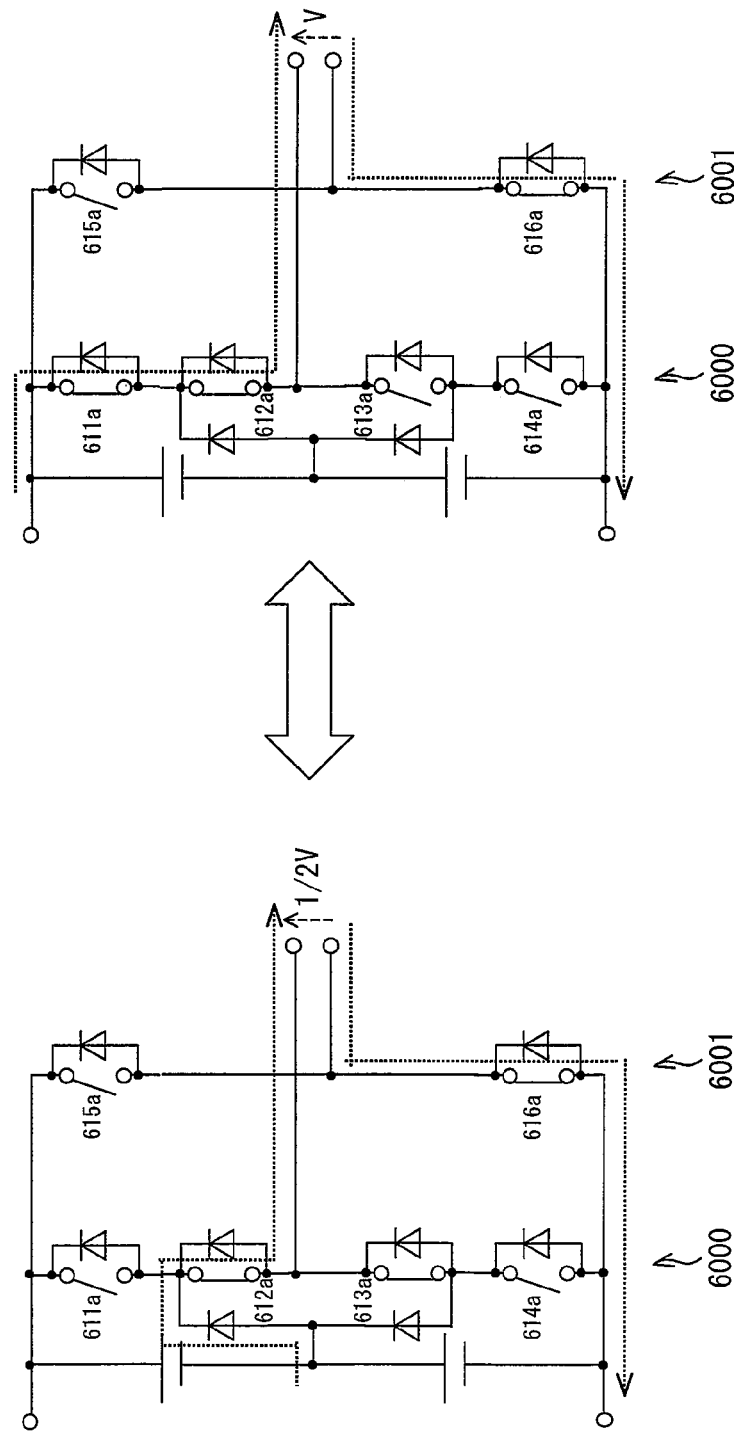
FIG. 3 is a circuit diagram illustrating a state in which the switching elements turn on/off during a time period from t2 to t3 in FIG. 28 in the case where the output current $i_o$ is positive in the circuit of FIG. 1.
Figure 4:
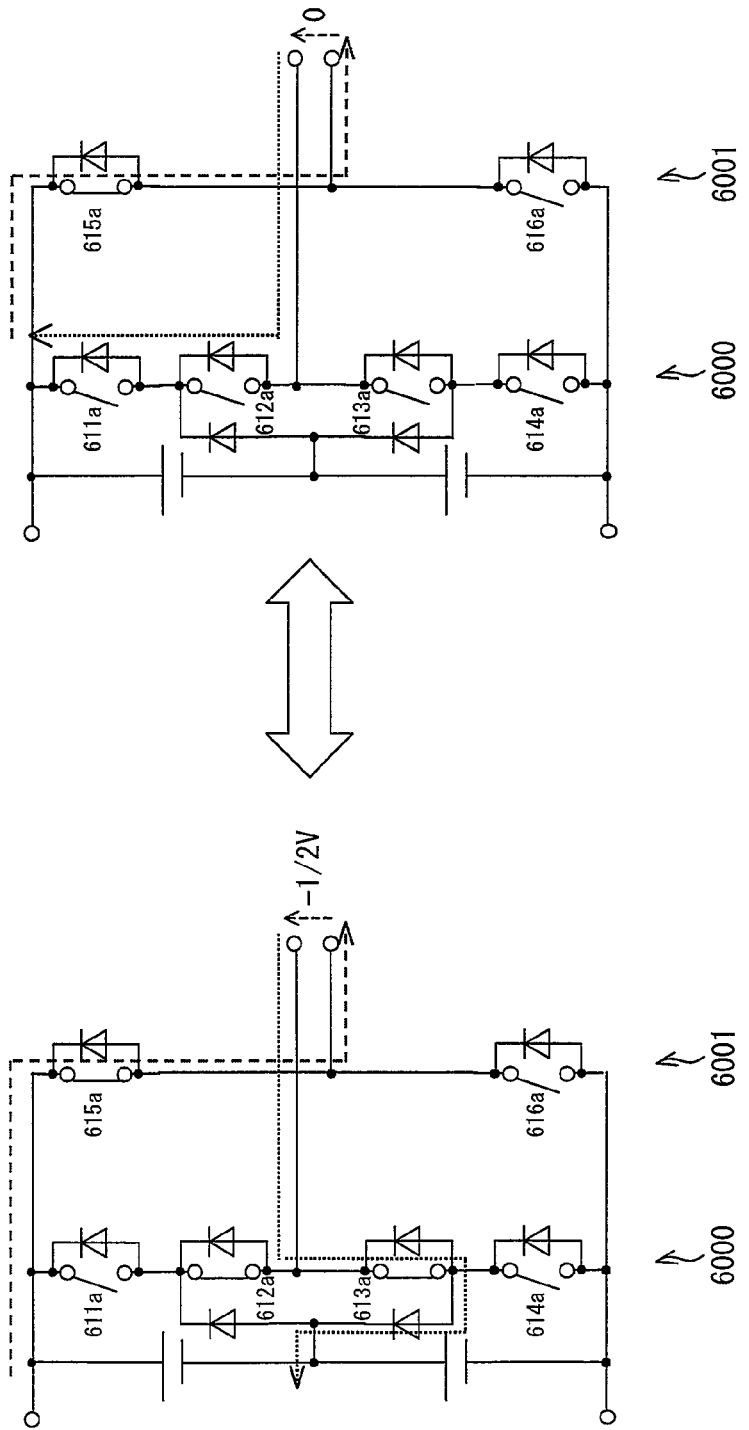
FIG. 4 is a circuit diagram illustrating a state in which the switching elements turn on/off during time periods (i) from t4 to t5 and (ii) from t6 to t7 in FIG. 28 in a case where the output current $i_o$ is negative in the circuit of FIG. 1.
Figure 5:
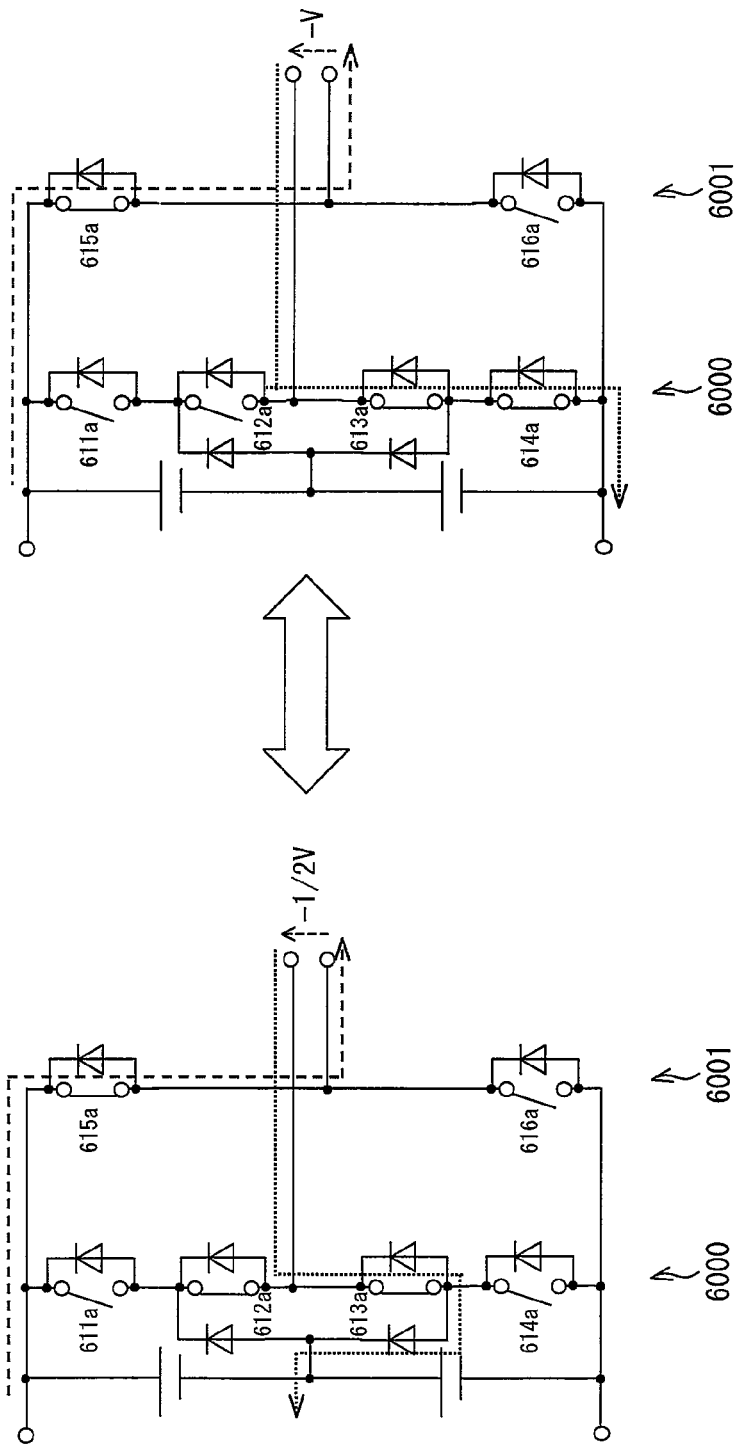
FIG. 5 is a circuit diagram illustrating a state in which the switching elements turn on/off during a time period from t5 to t6 in FIG. 28 in the case where the output current $i_o$ is negative in the circuit of FIG. 1.

The following description specifically discusses FIGS. 2 through 5. FIG. 2 is a circuit diagram illustrating the state in which switching elements turn on/off during time periods (i) from t1 to t2 and (ii) from t3 to t4 in FIG. 28 in a case where an output current $i_o$ is positive in the circuit of FIG. 1. FIG. 3 is a circuit diagram illustrating the state in which the switching elements turn on/off during a time period from t2 to t3 in FIG. 28 in the case where the output current $i_o$ is positive in the circuit of FIG. 1. FIG. 4 is a circuit diagram illustrating the state in which the switching elements turn on/off during time periods (i) from t4 to t5 and (ii) from t6 to t7 in FIG. 28 in a case where the output current $i_o$ is negative in the circuit of FIG. 1. FIG. 5 is a circuit diagram illustrating the state in which the switching elements turn on/off during a time period from t5 to t6 in FIG. 28 in the case where the output current $i_o$ is negative in the circuit of FIG. 1.

Figure 28:
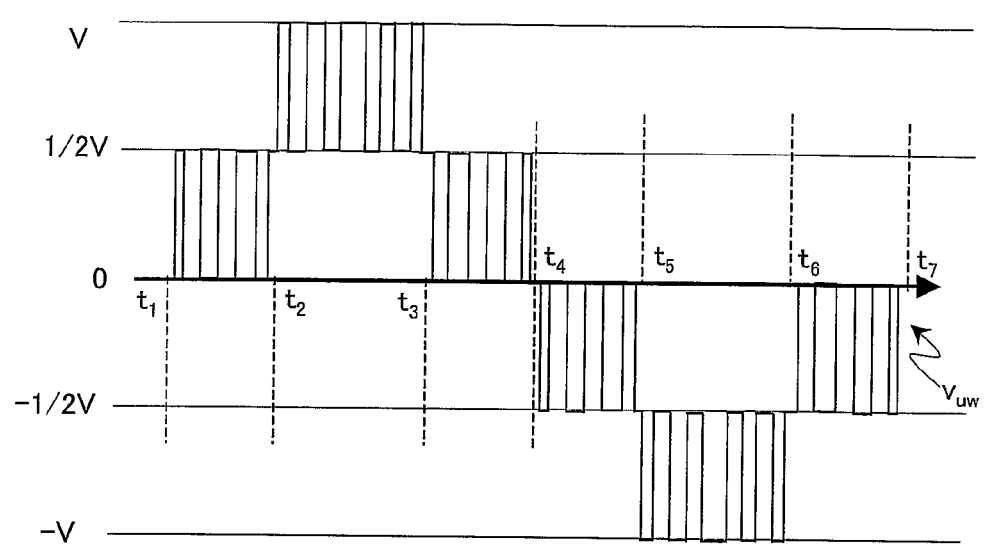
FIG. 28 is a waveform chart illustrating a waveform of a line voltage for one (1) period.
Figure 29:
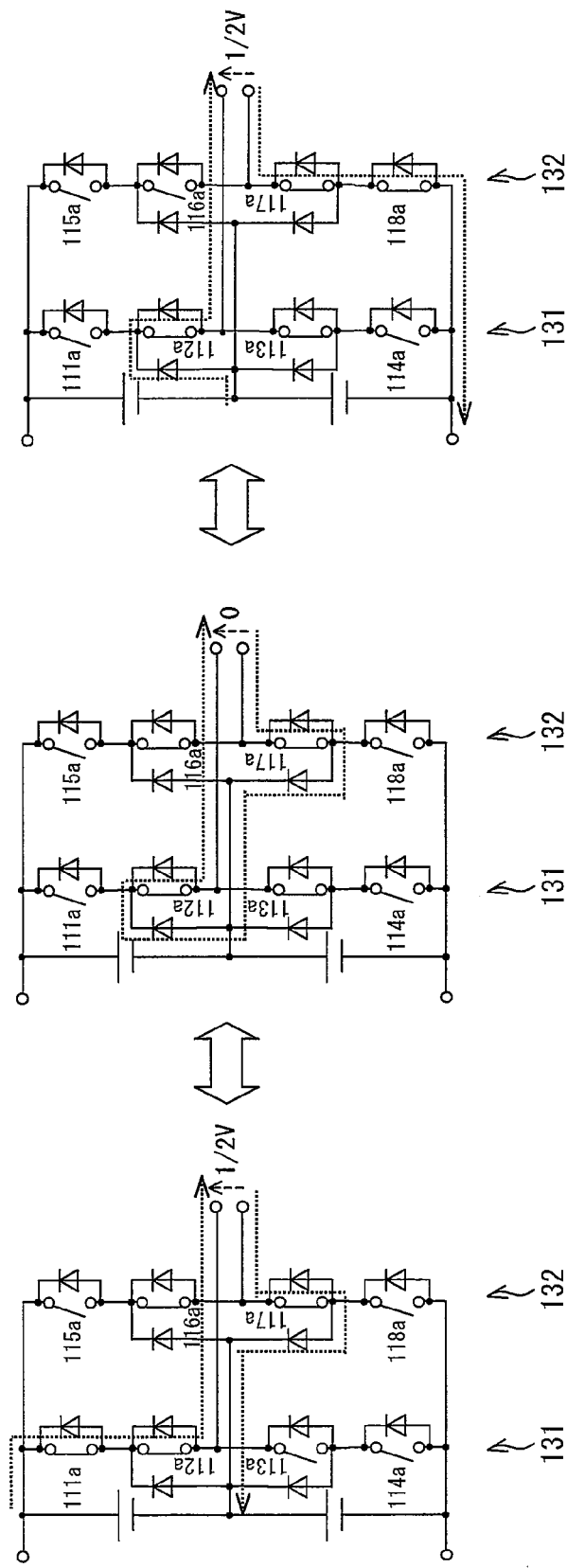
FIG. 29 is a circuit diagram illustrating a state in which switching elements turn on/off during the time periods (i) from t1 to t2 and (ii) from t3 to t4 in FIG. 28 in a case where an output current $i_o$ is positive in the circuit of FIG. 27.
Figure 30:
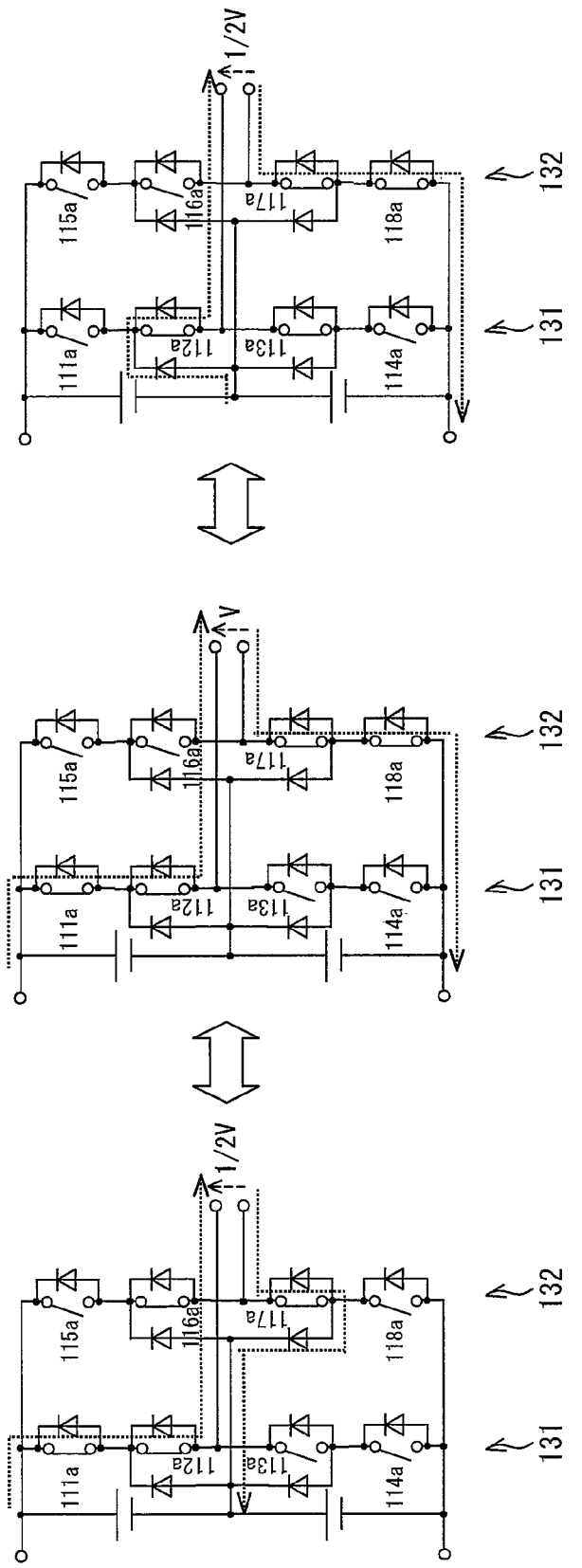
FIG. 30 is a circuit diagram illustrating a state in which the switching elements turn on/off during the time period from t2 to t3 in FIG. 28 in the case where the output current $i_o$ is positive in the circuit of FIG. 27.
Figure 31:
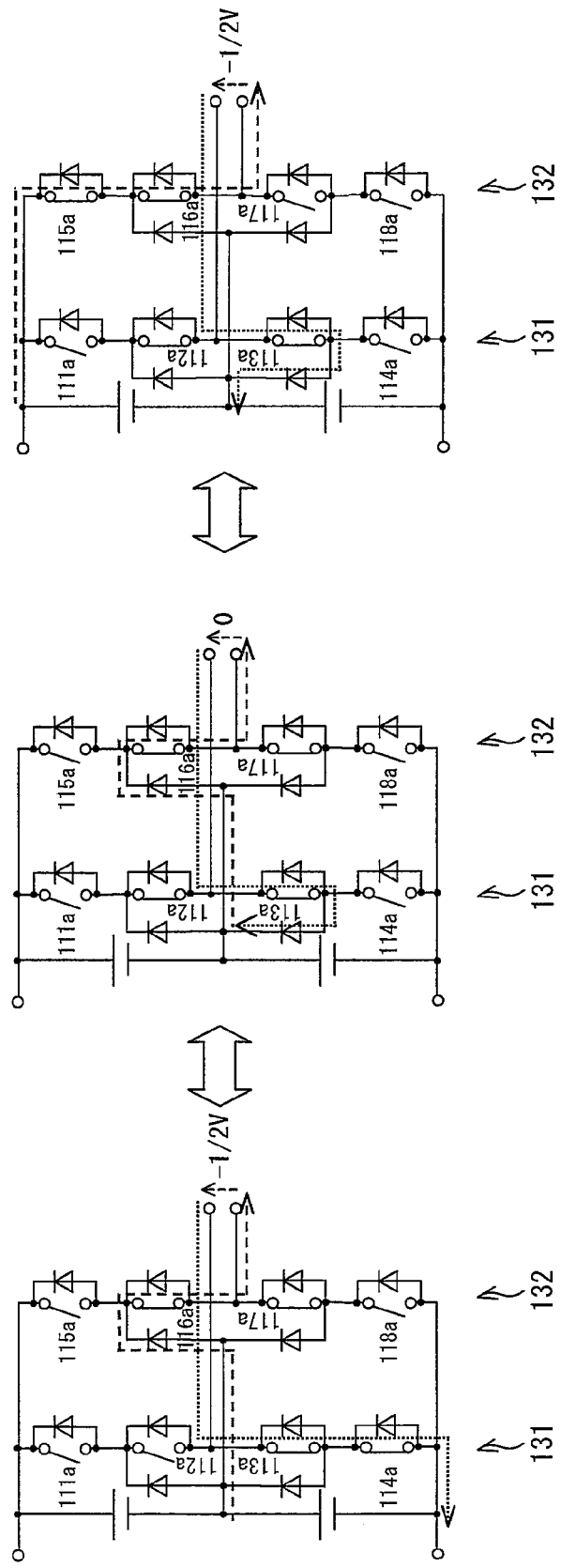
FIG. 31 is a circuit diagram illustrating a state in which the switching elements turn on/off during the time periods (i) from t4 to t5 and (ii) from t6 to t7 in FIG. 28 in a case where the output current $i_o$ is negative in the circuit of FIG. 27.
Figure 32:
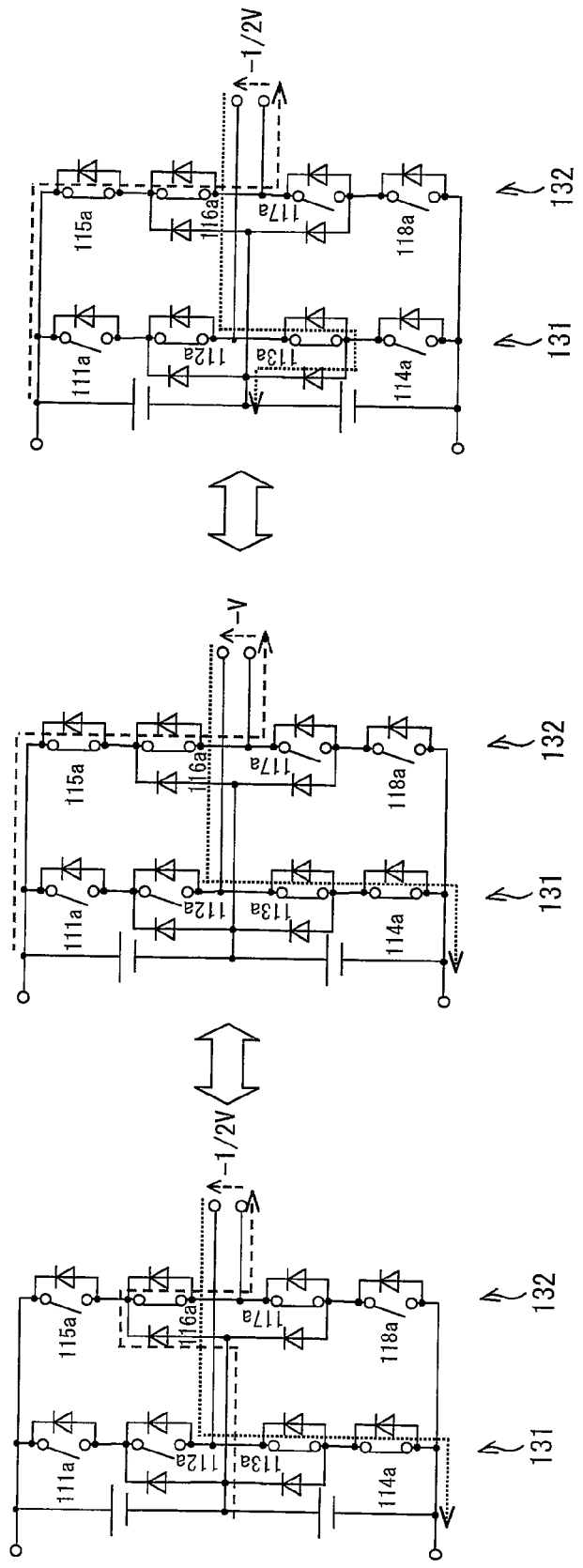
FIG. 32 is a circuit diagram illustrating a state in which the switching elements turn on/off during the time period from t5 to t6 in FIG. 28 in the case where the output current $i_o$ is negative in the circuit of FIG. 27.

First, during the time periods (i) from t1 to t2 and (ii) from t3 to t4 in FIG. 28, the inverter arm 6000 of U phase causes the switching element 611a to turn off and the switching element 614a to turn off. The inverter arm 6000 of U phase carries out PWM control with respect to the switching elements 612a and 613a such that the switching elements 612a and 613a have an identical polarity. In a case where two switching elements are subjected to PWM control such that the two switching elements have an identical polarity, one of the two switching elements turns on, and the other of the two switching elements also turns on. Same applies to a case where one of the two switching elements turns off.

In contrast, the inverter arm 6001 of W phase causes the switching element 615*a* to turn off and the switching element 616*a* to turn on.

Such switching control causes the state illustrated in FIG. 2 to repeatedly occur. Accordingly, the line voltage $v_{uw}$ has a waveform shown in the time periods (i) from t1 to t2 and (ii) from t3 to t4 in FIG. 28. The diodes 613*b* and 614*b*, which are connected to the respective switching elements 613*a* and 614*a* in an opposite polarity and in parallel, turn on when the line voltage $v_{uw}$ is 0 (zero).

Next, during the time period from t2 to t3 in FIG. 28, the inverter arm 6000 of U phase causes the switching element 612*a* to turn on and the switching element 614*a* to turn off. The inverter arm 6000 of U phase carries out PWM control with respect to the switching elements 611*a* and 613*a* such that the switching elements 611*a* and 613*a* have opposite polarities. In a where two switching elements are subjected to PWM control such that the two switching elements have opposite polarities, one of the two switching elements turns on, whereas the other of the two switching elements turns off.

In contrast, the inverter arm 6001 of W phase causes the switching element 615*a* to turn off and the switching element 616*a* to turn on.

Such switching control causes the state illustrated in FIG. 3 to repeatedly occur. Accordingly, the line voltage $v_{uw}$ has a waveform shown in the time period from t2 to t3 in FIG. 28.

Subsequently, during the time periods (i) from t4 to t5 and (ii) from t6 to t7 in FIG. 28, the inverter arm 6000 of U phase causes the switching element 611*a* to turn off and the switching element 614*a* to turn off. The inverter arm 6000 of U phase carries out PWM control with respect to the switching elements 612*a* and 613*a* such that the switching elements 612*a* and 613*a* have an identical polarity.

In contrast, the inverter arm 6001 of W phase causes the switching element 615*a* to turn on and the switching element 616*a* to turn off.

Such switching control causes the state illustrated in FIG. 4 to repeatedly occur. Accordingly, the line voltage $v_{uw}$ has a waveform shown in the time periods (i) from t4 to t5 and (ii) from t6 to t7 in FIG. 28. The diodes 611*b* and 612*b*, which are connected to the respective switching elements 611*a* and 612*a* in an opposite polarity and in parallel, turn on when the line voltage $v_{uw}$ is 0 (zero).

Then, during the time period from t5 to t6 in FIG. 28, the inverter arm 6000 of U phase causes the switching element 611*a* to turn off and the switching element 613*a* to turn on. The inverter arm 6000 of U phase carries out PWM control with respect to the switching elements 612*a* and 614*a* such that the switching elements 612*a* and 614*a* have opposite polarities.

In contrast, the inverter arm 6001 of W phase causes the switching element 615*a* to turn on and the switching element 616*a* to turn off.

Such switching control causes the state illustrated in FIG. 5 to repeatedly occur. Accordingly, the line voltage $v_{uw}$ has a waveform shown in the time period from t5 to t6 in FIG. 28.

The multilevel inverter 1 of FIG. 1 thus controls one (1) period from t1 to t7. When finishing control of the one period, the multilevel inverter 1 restarts controlling the one period at t1.

(Load in Which Line Voltage $v_{uw}$ and Output Current $i_o$ Have Different Phases)

FIGS. 6 through 9 are circuit diagrams illustrating respective states in which the switching elements turn on/off in case of a load in which the line voltage $v_{uw}$ and the output current $i_o$ have different phases (e.g., in a case where (i) the present invention is applied to a utility interactive inverter so that the utility interactive inverter autonomously operates and (ii) the load is an L load). (The L load in which the utility interactive inverter autonomously operates is to be described later.)

How the utility interactive inverter operates is described here. The utility interactive inverter basically carries out two operations, i.e., an interactive operation and an autonomous operation. The interactive operation is an operation in which the utility interactive inverter is connected to a commercial system, so as to supply alternating current power. In contrast, the autonomous operation is an operation in which the utility interactive inverter is connected to no commercial system, so as to supply alternating current power to various loads that are not commercial systems. A state in which each of the various loads, to which the utility interactive inverter is connected during the autonomous operation, is the L load such as a motor is to be referred to as the "L load in which the utility interactive inverter autonomously operates" as described earlier.

Figure 6:
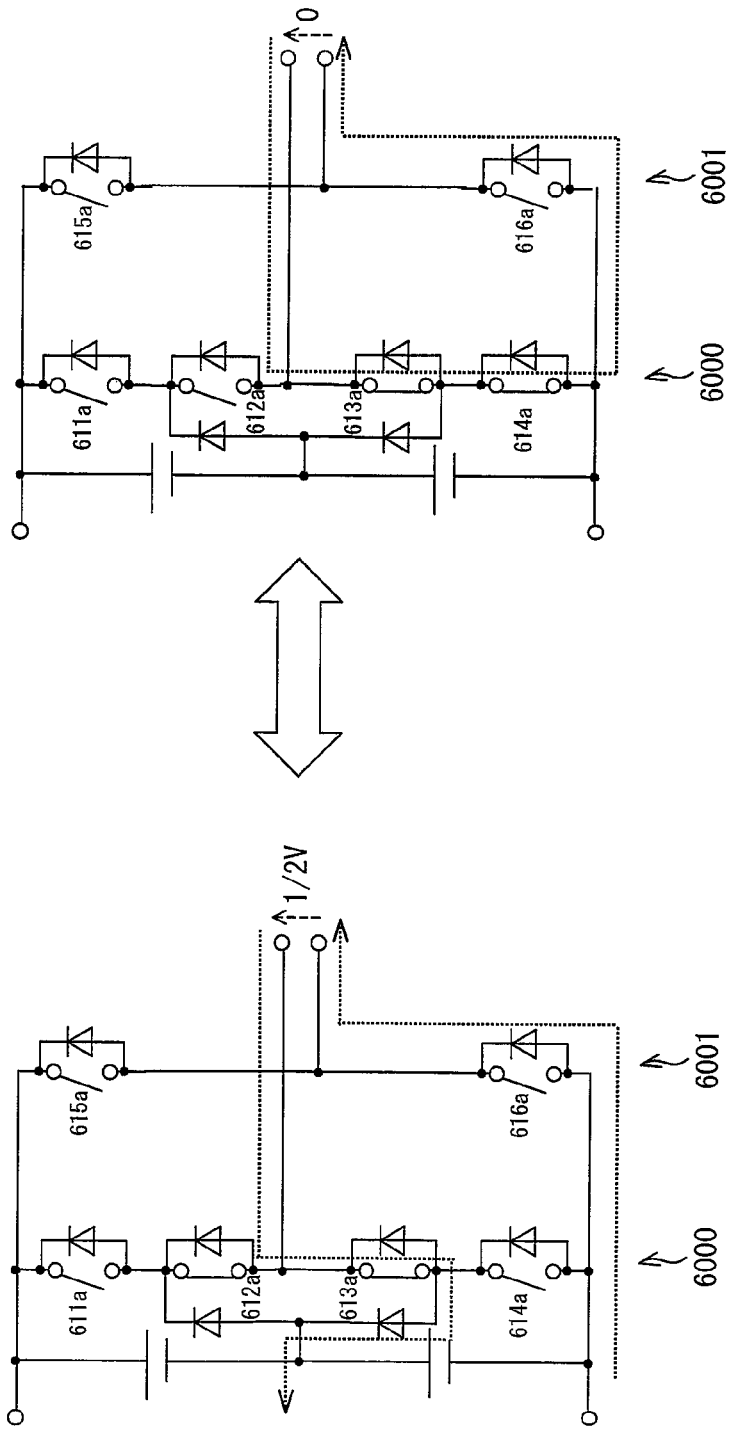
FIG. 6 is a circuit diagram illustrating a state in which the switching elements turn on/off during the time periods (i) from t1 to t2 and (ii) from t3 to t4 in FIG. 28 in the case where the output current $i_o$ is negative in the circuit of FIG. 1.
Figure 7:
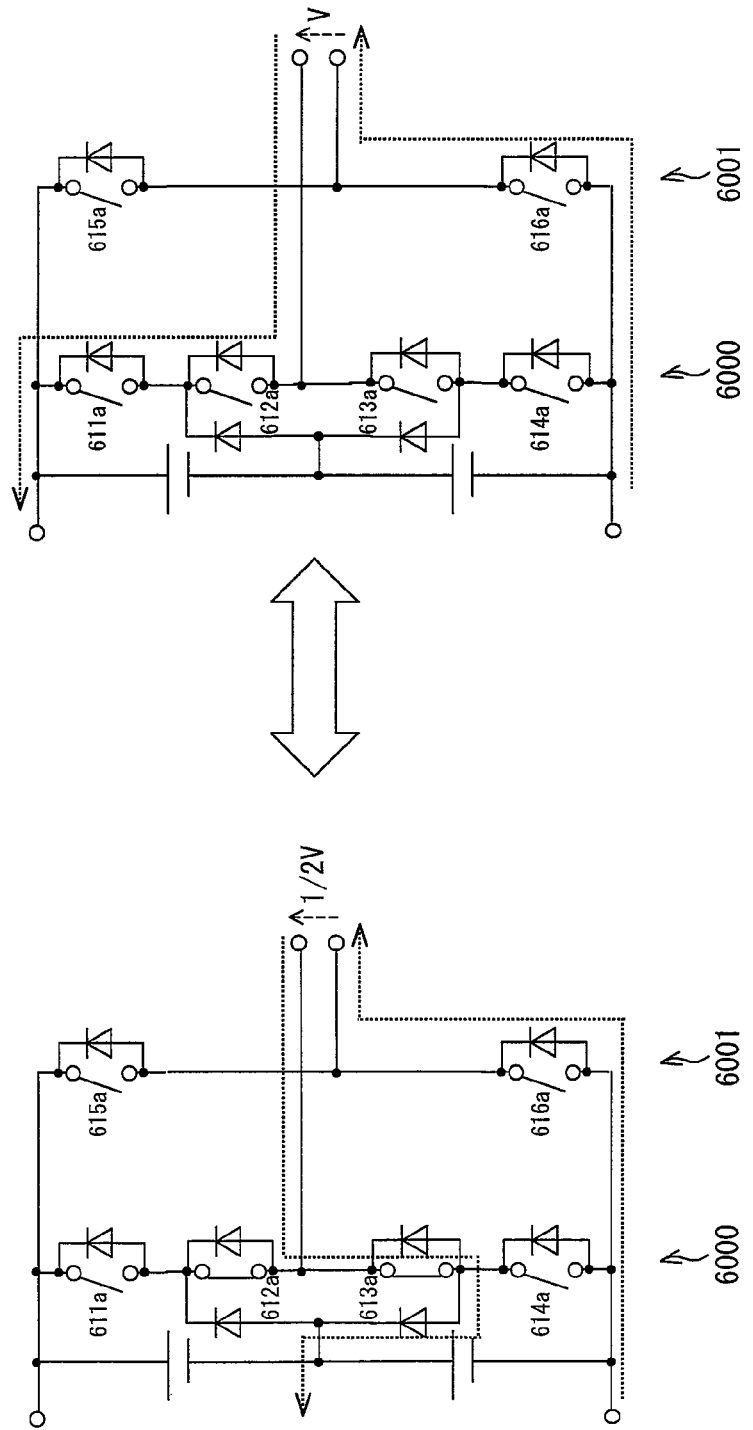
FIG. 7 is a circuit diagram illustrating a state in which the switching elements turn on/off during the time period from t2 to t3 in FIG. 28 in the case where the output current $i_o$ is negative in the circuit of FIG. 1.
Figure 8:
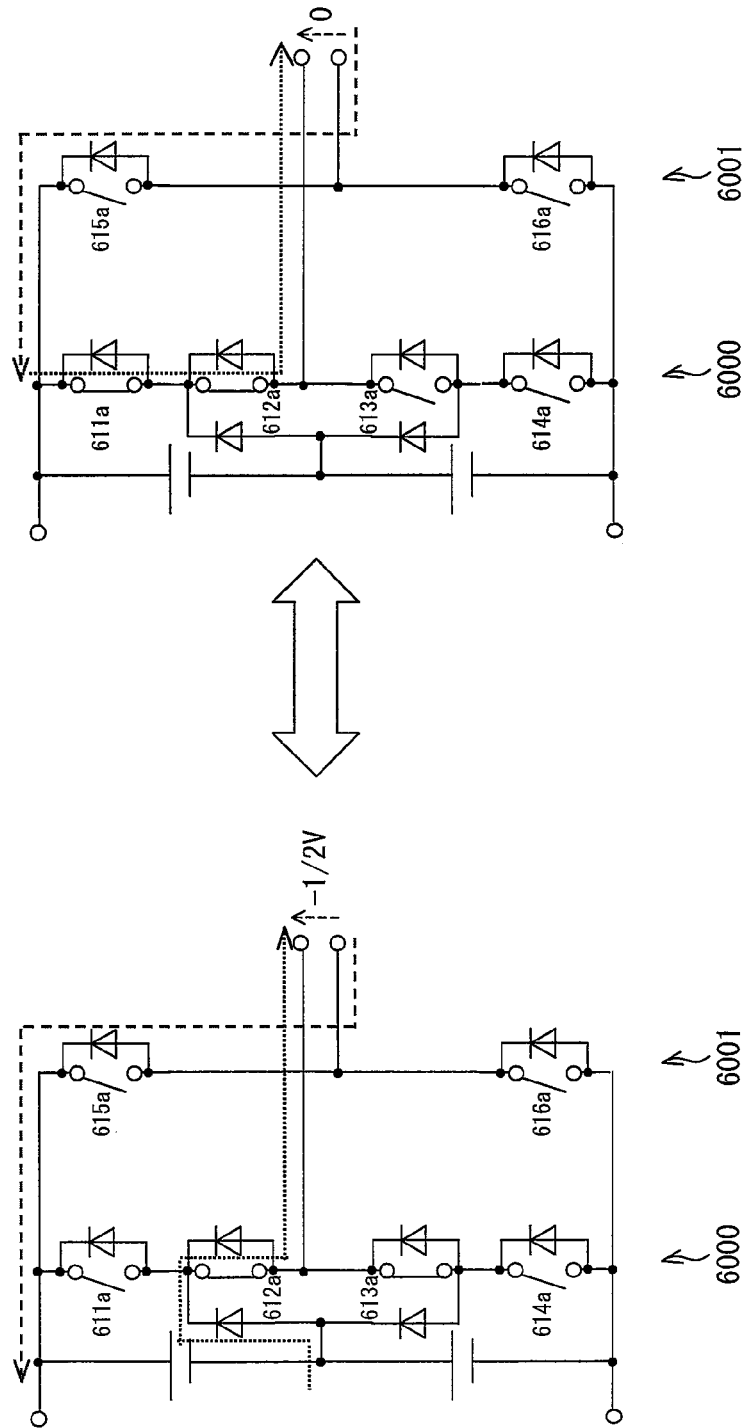
FIG. 8 is a circuit diagram illustrating a state in which the switching elements turn on/off during the time periods (i) from t4 to t5 and (ii) from t6 to t7 in FIG. 28 in the case where the output current $i_o$ is positive in the circuit of FIG. 1.
Figure 9:
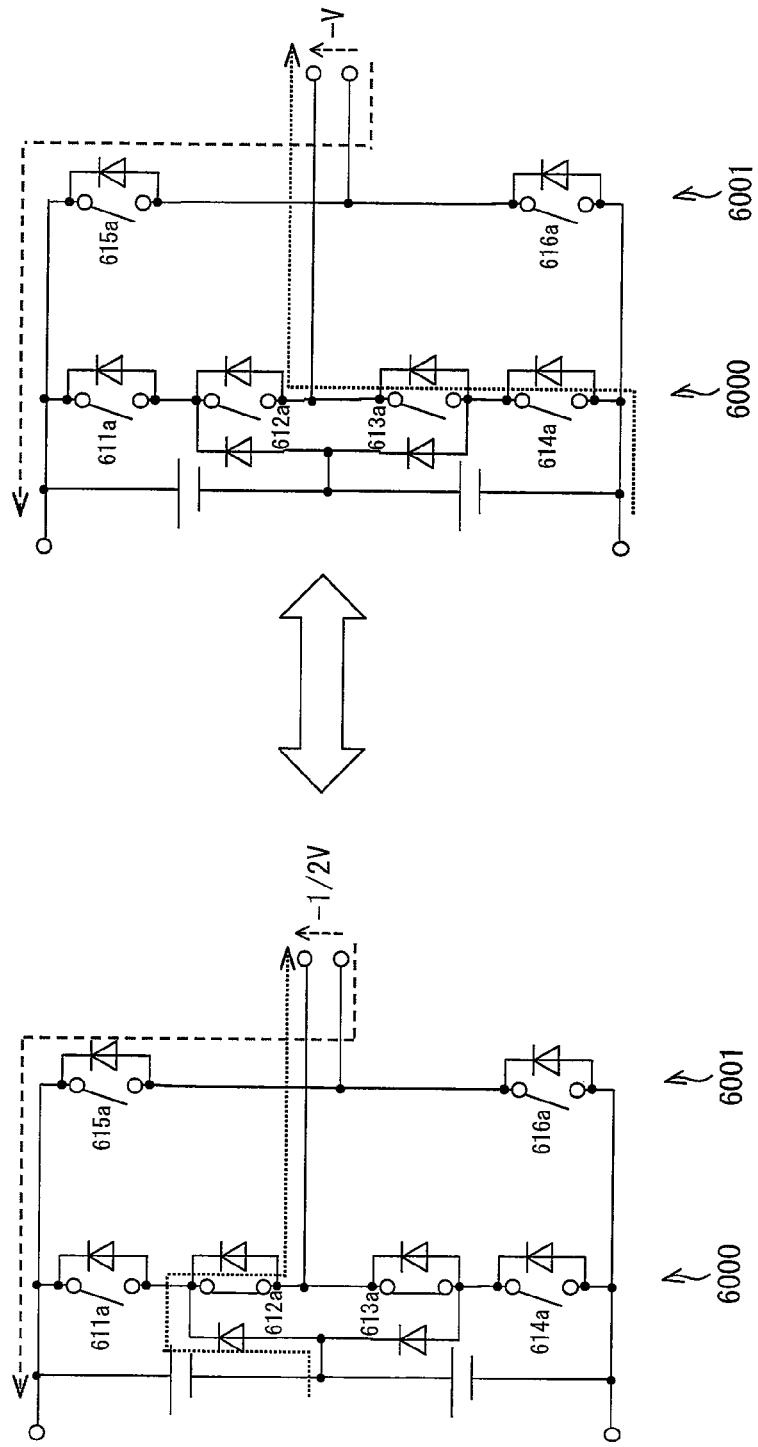
FIG. 9 is a circuit diagram illustrating a state in which the switching elements turn on/off during the time period from t5 to t6 in FIG. 28 in the case where the output current $i_o$ is positive in the circuit of FIG. 1.

The following description specifically discusses FIGS. 6 through 9. FIG. 6 is a circuit diagram illustrating the state in which the switching elements turn on/off during the time periods (i) from t1 to t2 and (ii) from t3 to t4 in FIG. 28 in the case where the output current $i_o$ is negative in the circuit of FIG. 1. FIG. 7 is a circuit diagram illustrating the state in which the switching elements turn on/off during the time period from t2 to t3 in FIG. 28 in the case where the output current $i_o$ is negative in the circuit of FIG. 1. FIG. 8 is a circuit diagram illustrating the state in which the switching elements turn on/off during the time periods (i) from t4 to t5 and (ii) from t6 to t7 in FIG. 28 in the case where the output current $i_o$ is positive in the circuit of FIG. 1. FIG. 9 is a circuit diagram illustrating the state in which the switching elements turn on/off during the time period from t5 to t6 in FIG. 28 in the case where the output current $i_o$ is positive in the circuit of FIG. 1.

First, in the case where the output current $i_o$ is positive during the time periods (i) from t1 to t2 and (ii) from t3 to t4 in FIG. 28, it is only necessary that the multilevel inverter 1 cause the switching elements to turn on/off as illustrated in FIG. 2.

In contrast, in the case where the output current $i_o$ is negative during the time periods (i) from t1 to t2 and (ii) from t3 to t4 in FIG. 28, the inverter arm 6000 of U phase causes the switching element 611*a* to turn off and the switching element 613*a* to turn on. The inverter arm 6000 of U phase carries out PWM control with respect to the switching elements 612*a* and 614*a* such that the switching elements 612*a* and 614*a* have opposite polarities. In contrast, the inverter arm 6001 of W phase causes the switching element 615*a* to turn off and the switching element 616*a* to turn off.

Such switching control causes the state illustrated in FIG. 6 to repeatedly occur. Accordingly, in the state in which the output current $i_o$ is negative, the line voltage $v_{uw}$ has the waveform shown in the time periods (i) from t1 to t2 and (ii) from t3 to t4 in FIG. 28. The diode 616*b*, which is connected to the switching element 616*a* in an opposite polarity and in parallel, turns on in the state illustrated in FIG. 6.

Next, in the case where the output current $i_o$ is positive during the time period from t2 to t3 in FIG. 28, it is only necessary that the multilevel inverter 1 cause the switching elements to turn on/off as illustrated in FIG. 3.

In contrast, in the case where the output current $i_o$ is negative during the time period from t2 to t3 in FIG. 28, the inverter arm 6000 of U phase causes the switching element 611a to turn off and the switching element 614a to turn off. The inverter arm 6000 of U phase carries out PWM control with respect to the switching elements 612a and 613a such that the switching elements 612a and 613a have an identical polarity. In contrast, the inverter arm 6001 of W phase causes the switching element 615a to turn off and the switching element 616a to turn off.

Such switching control causes the state illustrated in FIG. 7 to repeatedly occur. Accordingly, in the state in which the output current $i_o$ is negative, the line voltage $v_{uw}$ has the waveform shown in the time period from t2 to t3 in FIG. 28. The diode 616b, which is connected to the switching element 616a in an opposite polarity and in parallel, turns on in the state illustrated in FIG. 7. The diodes 611b and 612b, which are connected to the respective switching elements 611a and 612a in an opposite polarity and in parallel, turn on when the line voltage $v_{uw}$ is V.

Subsequently, in the case where the output current $i_o$ is negative during the time periods (i) from t4 to t5 and (ii) from t6 to t7 in FIG. 28, it is only necessary that the multilevel inverter 1 cause the switching elements to turn on/off as illustrated in FIG. 4.

In contrast, in the case where the output current $i_o$ is positive during the time periods (i) from t4 to t5 and (ii) from t6 to t7 in FIG. 28, the inverter arm 6000 of U phase causes the switching element 612a to turn on and the switching element 614a to turn off. The inverter arm 6000 of U phase carries out PWM control with respect to the switching elements 611a and 613a such that the switching elements 611a and 613a have opposite polarities. In contrast, the inverter arm 6001 of W phase causes the switching element 615a to turn off and the switching element 616a to turn off.

Such switching control causes the state illustrated in FIG. 8 to repeatedly occur. Accordingly, in the state in which the output current $i_o$ is positive, the line voltage $v_{uw}$ has the waveform shown in the time periods (i) from t4 to t5 and (ii) from t6 to t7 in FIG. 28. The diode 615b, which is connected to the switching element 615a in an opposite polarity and in parallel, turns on in the state illustrated in FIG. 8.

Then, in the case where the output current $i_o$ is negative during the time period from t5 to t6 in FIG. 28, it is only necessary that the multilevel inverter 1 cause the switching elements to turn on/off as illustrated in FIG. 5.

In contrast, in the case where the output current $i_o$ is positive during the time period from t5 to t6 in FIG. 28, the inverter arm 6000 of U phase causes the switching element 611a to turn off and the switching element 614a to turn off. The inverter arm 6000 of U phase carries out PWM control with respect to the switching elements 612a and 613a such that the switching elements 612a and 613a have an identical polarity. In contrast, the inverter arm 6001 of W phase causes the switching element 615a to turn off and the switching element 616a to turn off.

Such switching control causes the state illustrated in FIG. 9 to repeatedly occur. Accordingly, in the state in which the output current $i_o$ is positive, the line voltage $v_{uw}$ has the waveform shown in the time period from t5 to t6 in FIG. 28. The diodes 613b and 614b, which are connected to the respective switching elements 613a and 614a in an opposite polarity and in parallel, turn on when the line voltage $v_{uw}$ is –V.

The multilevel inverter 1 of FIG. 1 thus controls one (1) period from t1 to t7. When finishing control of the one period, the multilevel inverter 1 restarts controlling the one period at t1.

As described earlier, according to the multilevel inverter 1 in accordance with the first embodiment of the present invention, the switching elements of the inverter arm 6000 are suitably controlled to turn on/off. This allows any one of (i) a direct current voltage applied to the highest electric potential point, (ii) a direct current voltage applied to the lowest electric potential point, and (iii) a direct current voltage applied to the power supply connection point to be supplied to the U phase output terminal 606. In a case where the switching elements of the inverter arm 6001 are suitably controlled to turn on/off, either one of (i) the direct current voltage applied to the highest electric potential point and (ii) the direct current voltage applied to the lowest electric potential point can be supplied to the W phase output terminal 607. This allows the line voltage $v_{uw}$ to be outputted.

The multilevel inverter 1 further includes a control circuit 50 (control means). The control circuit 50 can supply signals to the respective switching elements 615a and 616a, and 611a through 614a, the signals controlling the respective switching elements 615a and 616a, and 611a through 614a to turn on/off. The switching elements 615a and 616a belong to a first switching element group. The switching elements 611a through 614a belong to a second switching element group. The control circuit 50 can carry out switching control so as to prevent (i) the switching elements 615a and 616a belonging to the first switching element group from simultaneously turning on and (ii) all the switching elements 611a through 614a belonging to the second switching element group from simultaneously turning on. In addition to such switching control, the control circuit 50 can carry out the switching control as illustrated in FIGS. 2 through 9. Namely, of the switching elements belonging to the second switching element group, the control circuit 50 can (i) carry out PWM control with respect to any given number of switching elements and (ii) control the other switching elements to keep turning on/off. The control circuit 50 can further control either one of the switching elements belonging to the first switching element group to turn on/off in accordance with a polarity of an output current outputted via the second output terminal.

This allows a voltage which has been subjected to PWM control to be outputted as the line voltage $v_{uw}$.

Further, the multilevel inverter 1 is usable both for a load which requires the output current $i_o$ to be positive and for a load which requires the output current $i_o$ to be negative.

Figure 23:
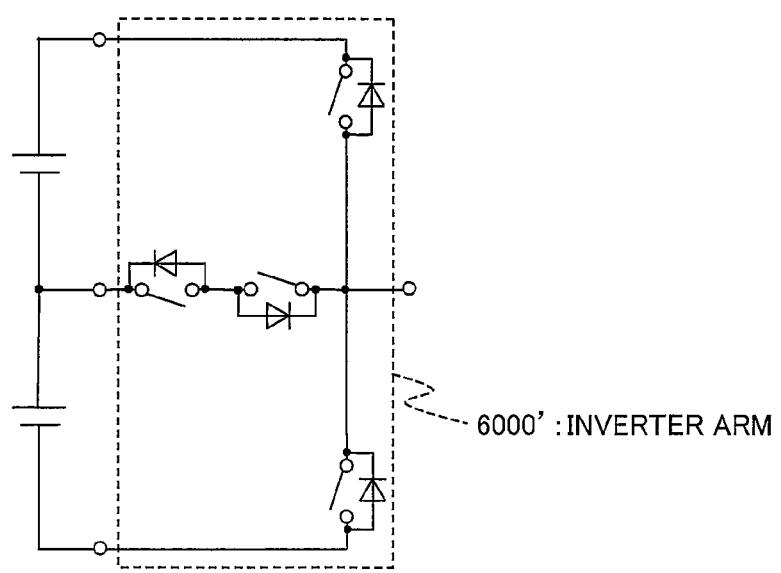
FIG. 23 is a circuit diagram illustrating an inverter arm of Patent Literature 2 which inverter arm is replaced with an inverter arm of FIG. 1.

Note that an inverter arm 6000' of Patent Literature 2 illustrated in FIG. 23 can replace the inverter arm 6000 of FIG. 1 as a modification of the first embodiment. An effect of the invention in accordance with Patent Literature 2 allows a further reduction in number of diodes and in number of floating power supplies.

Second Embodiment

A second embodiment of the present invention is described below with reference to FIGS. 10 through 20. Note that an arrangement which is not described in the second embodiment is identical to the arrangement described in the first embodiment. Note also that, for convenience, members having functions identical to those of the respective members illustrated in the drawings of the first embodiment are given respective identical reference numerals, and a description of those members is omitted here.

Figure 10:
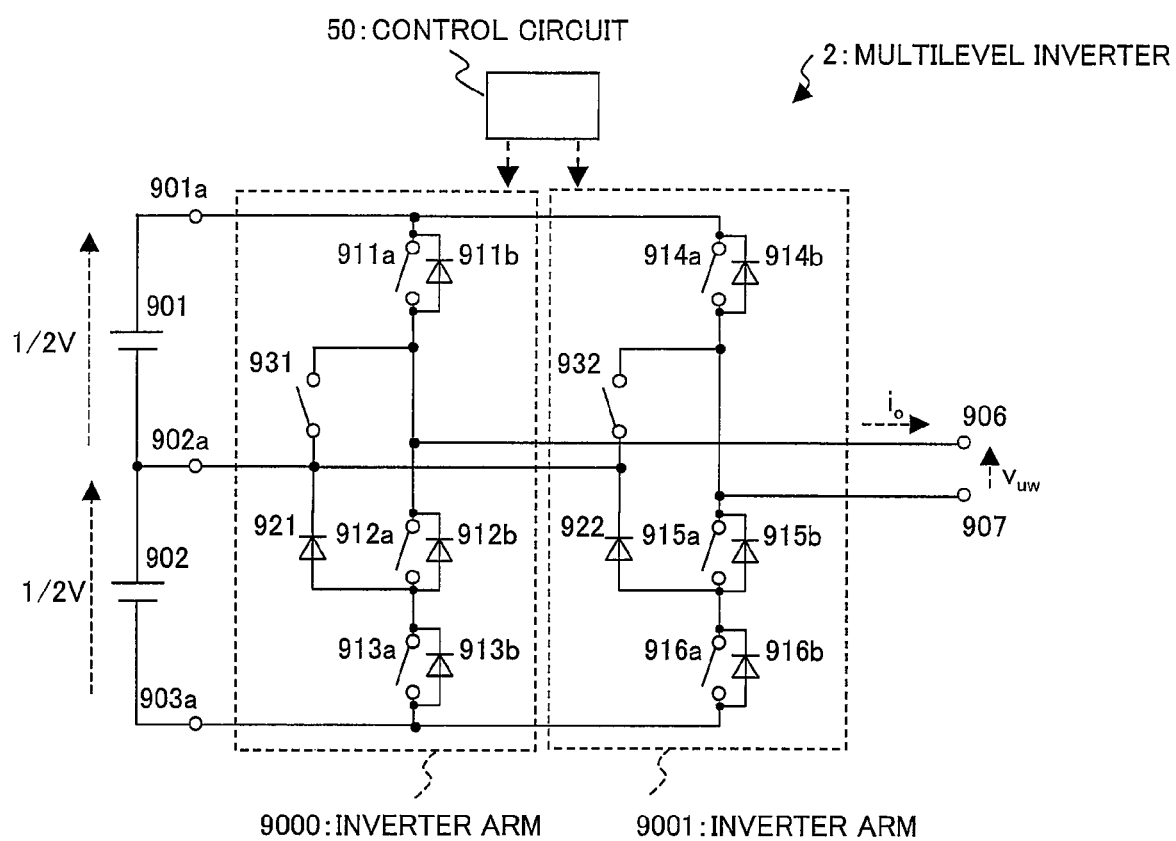
FIG. 10 is a circuit diagram of a multilevel inverter in accordance with a second embodiment of the present invention.

FIG. 10 is a circuit diagram of a multilevel inverter 2 in accordance with the second embodiment.

The multilevel inverter 2 of FIG. 10 is arranged such that a line voltage $v_{uw}$ which is a voltage of a difference between a U phase voltage outputted via a U phase output terminal 906 and a W phase voltage outputted via a W phase output terminal 907 is supplied to a load which is connected between the U phase output terminal 906 and the W phase output terminal 907. $i_o$ in FIG. 10 indicates an output current. A waveform of the line voltage $v_{uw}$ for one (1) period is shown in the waveform chart of FIG. 28 as in the case of the conventional example.

The multilevel inverter 2 generally includes direct current power supplies 901 and 902 (a plurality of direct power supplies), an inverter arm 9000 (a second inverter arm), and an inverter arm 9001 (a first inverter arm).

The direct current power supply 901 has a positive terminal which is connected to a direct current voltage terminal 901a and a negative terminal which is connected to a direct current voltage terminal 902a. The direct current power supply 901 applies a voltage of ½ V between the direct current voltage terminal 901a and the direct current voltage terminal 902a. The direct current power supply 902 has a positive terminal which is connected to the direct current voltage terminal 902a and a negative terminal which is connected to a direct current voltage terminal 903a. The direct current power supply 902 applies a voltage of ½ V between the direct current voltage terminal 902a and the direct current voltage terminal 903a. This causes the direct current voltage terminals 901a through 903a to have respective different direct current voltages.

The inverter arm 9000 is provided between the direct current voltage terminals 901a through 903a and a U phase output terminal 906 (a second output terminal). The inverter arm 9000 includes switching elements 911a through 913a (a second switching element group) which are connected in series and diodes 911b through 913b which are connected to the respective switching elements 911a through 913a in an opposite polarity and in parallel. The inverter arm 9000 further includes a switching element 931 (a second switching element) one end of which is connected to the direct current voltage terminal 902a which is a direct current voltage dividing point and a diode 921 whose cathode is connected to the direct current voltage dividing point. The inverter arm 9000 controls turning on/off of the switching elements 911a and 931 in accordance with a direction of the output current $i_o$ (whether the output current $i_o$ is positive or negative) in the multilevel inverter 2, so as to selectively carry out PWM control with respect to the switching elements 912a and 913a. This causes the U phase voltage to be outputted via the U phase output terminal 906.

The inverter arm 9001 is provided between the direct current voltage terminals 901a through 903a and a W phase output terminal 907 (a first output terminal). The inverter arm 9001 includes switching elements 914a through 916a (a first switching element group) which are connected in series and diodes 914b through 916b which are connected to the respective switching elements 914a through 916a in an opposite polarity and in parallel. The inverter arm 9001 further includes a switching element 932 (a first switching element) one end of which is connected to the direct current voltage terminal 902a which is the direct current voltage dividing point and a diode 922 whose cathode is connected to the direct current voltage dividing point. The inverter arm 9001 controls turning on/off of the switching elements 914a and 932 in accordance with the direction of the output current $i_o$ in the multilevel inverter 2, so as to selectively carry out PWM control with respect to the switching elements 915a and 916a. This causes the W phase voltage to be outputted via the W phase output terminal 907.

In the multilevel inverter 2 of FIG. 10, the current voltage terminal 901a is connected to one end of the switching element 911a, a cathode of the diode 911b, one end of the switching element 914a, and a cathode of the diode 914b.

The other end of the switching element 911a, an anode of the diode 911b, one end of the switching element 912a, a cathode of the diode 912b, the other end of the switching element 931, and the U phase output terminal 906 are connected to one another.

The other end of the switching element 912a, an anode of the diode 912b, one end of the switching element 913a, a cathode of the diode 913b, and an anode of the diode 921 are connected to one another.

The other end of the switching element 914a, an anode of the diode 914b, one end of the switching element 915a, a cathode of the diode 915b, the other end of the switching element 932, and the W phase output terminal 907 are connected to one another.

The other end of the switching element 915a, an anode of the diode 915b, one end of the switching element 916a, a cathode of the diode 916b, and an anode of the diode 922 are connected to one another.

One end of the switching element 931, a cathode of the diode 921, one end of the switching element 932, a cathode of the diode 922, and the direct current voltage terminal 902a are connected to one another.

The other end of the switching element 913a, an anode of the diode 913b, the other end of the switching element 916a, an anode of the diode 916b, and the direct current voltage terminal 903a are connected to one another.

Four diodes have been reduced in the multilevel inverter 2 of FIG. 10 in accordance with the second embodiment of the present invention as compared to the conventional single phase three level inverter of FIG. 27. Though no switching elements have been reduced, sources of respective of (i) the switching elements 911a and 931 and (ii) the switching elements 914a and 932 of FIG. 10 can be shared in a case where (i) and (ii) are MOSFETs. This allows two floating power supplies to be reduced.

This makes it possible to provide a multilevel (single phase three level) inverter in which at least one of (i) the number of switching elements, (ii) the number of diodes, and (iii) the number of floating power supplies has been reduced as compared to the conventional single phase three level inverter of FIG. 27.

FIGS. 11 through 18 are circuit diagrams illustrating respective states in which the switching elements of the multilevel inverter 2 of FIG. 10 turn on/off.

Figure 11:
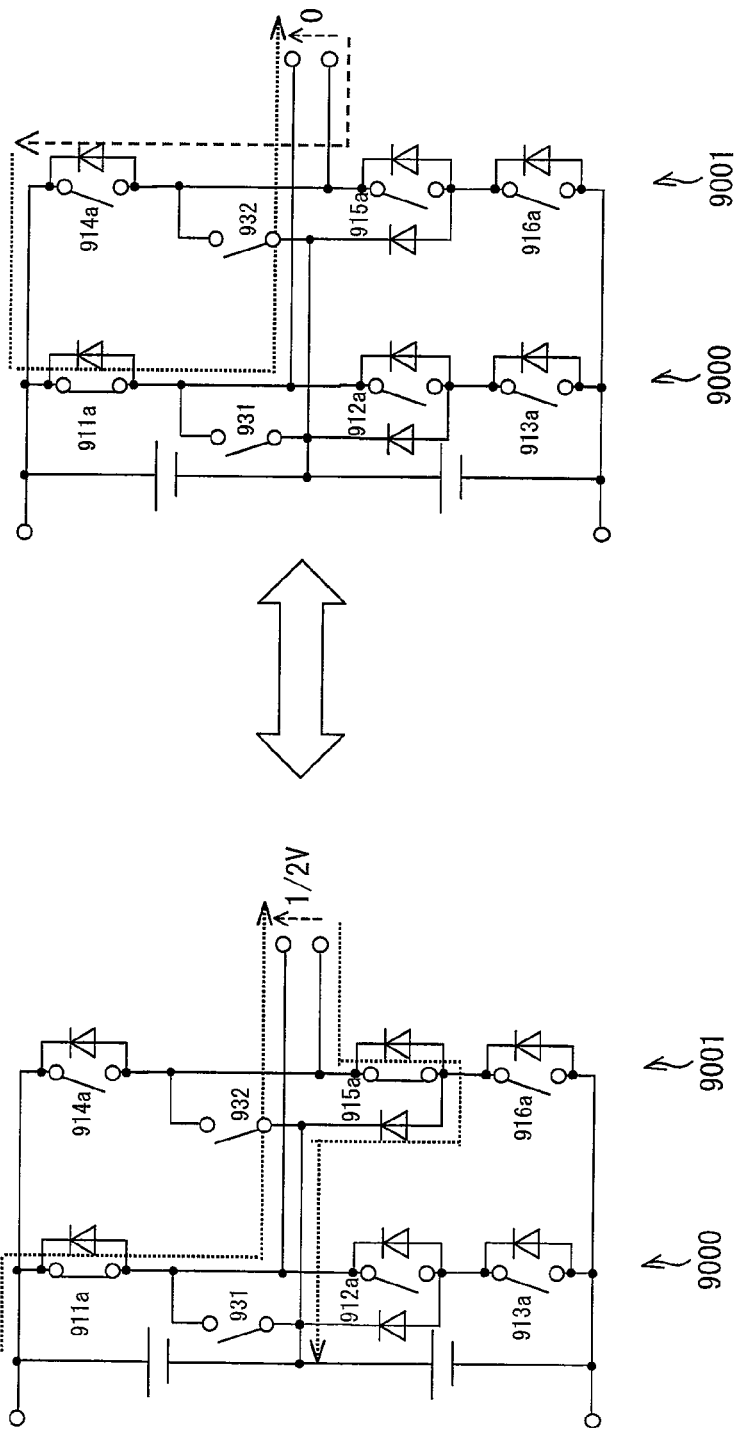
FIG. 11 is a circuit diagram illustrating a state in which switching elements turn on/off during the time periods (i) from t1 to t2 and (ii) from t3 to t4 in FIG. 28 in a case where an output current $i_o$ is positive in the circuit of FIG. 10.
Figure 12:
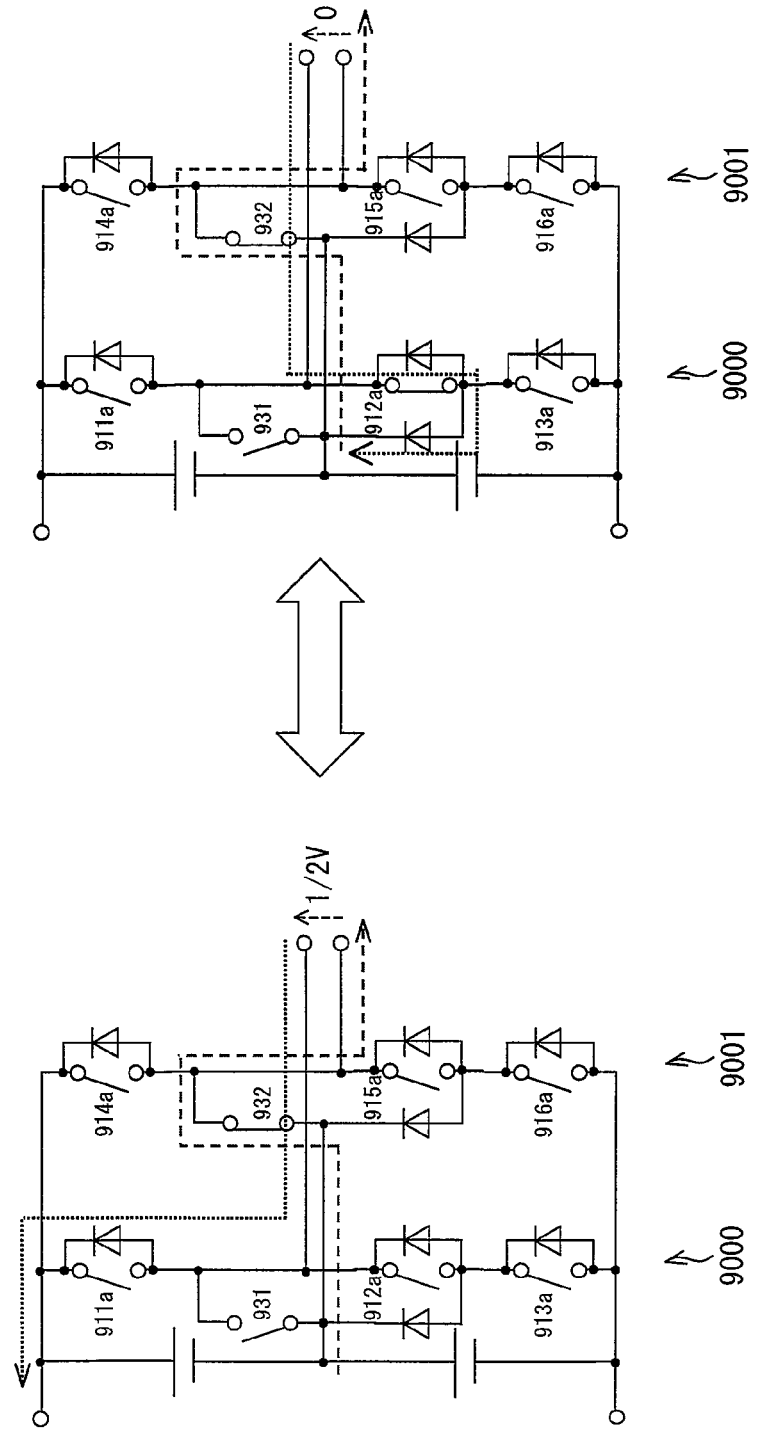
FIG. 12 is a circuit diagram illustrating a state in which the switching elements turn on/off during the time periods (i) from t1 to t2 and (ii) from t3 to t4 in FIG. 28 in a case where the output current $i_o$ is negative in the circuit of FIG. 10.
Figure 13:
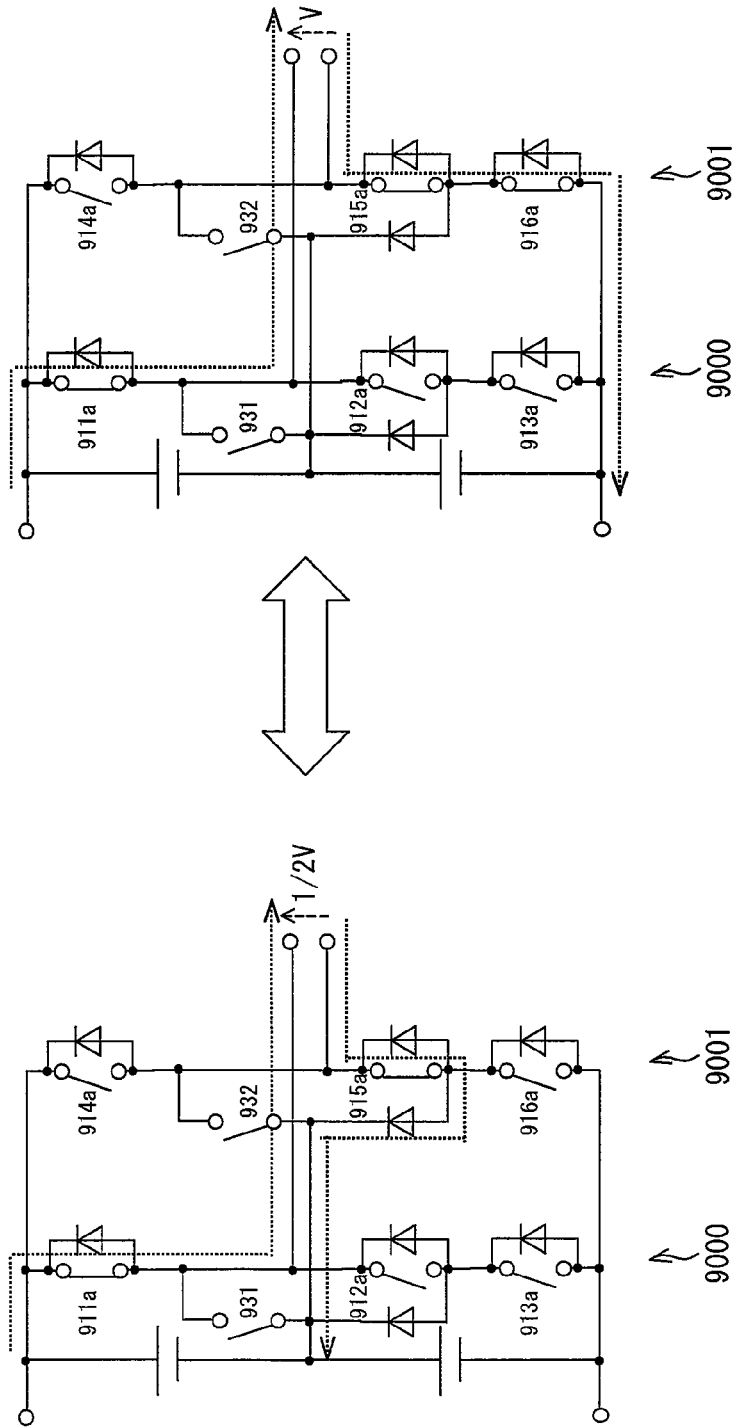
FIG. 13 is a circuit diagram illustrating a state in which the switching elements turn on/off during the time period from t2 to t3 in FIG. 28 in the case where the output current $i_o$ is positive in the circuit of FIG. 10.
Figure 14:
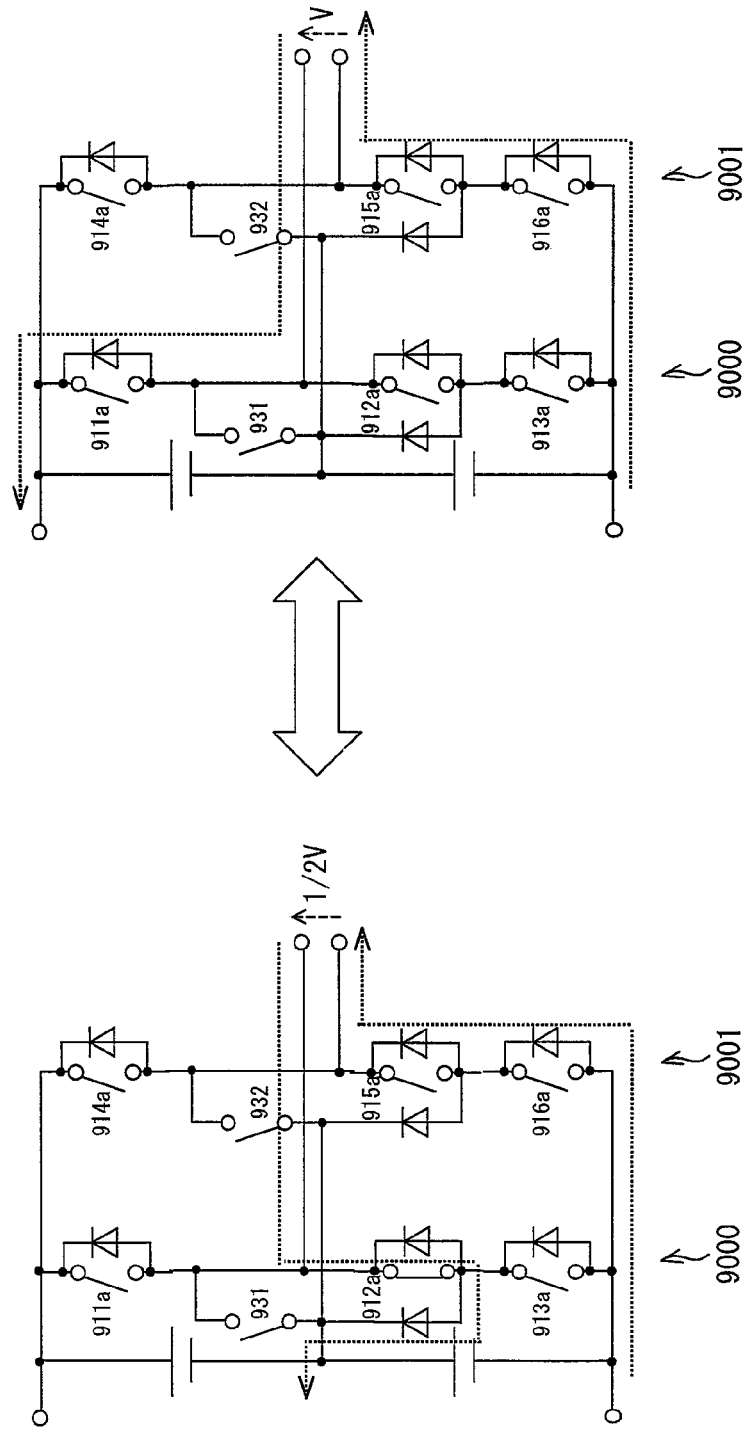
FIG. 14 is a circuit diagram illustrating a state in which the switching elements turn on/off during the time period from t2 to t3 in FIG. 28 in the case where the output current $i_o$ is negative in the circuit of FIG. 10.
Figure 15:
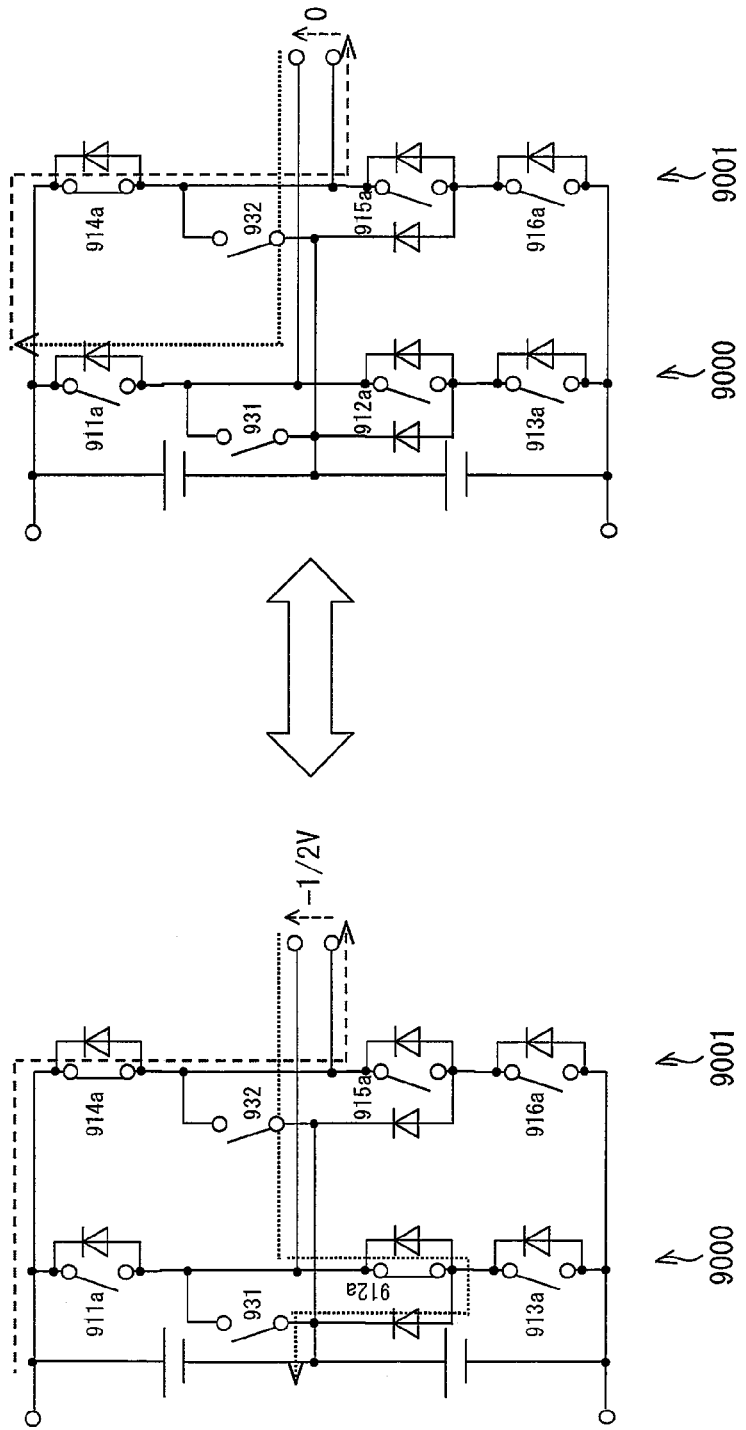
FIG. 15 is a circuit diagram illustrating a state in which the switching elements turn on/off during the time periods (i) from t4 to t5 and (ii) from t6 to t7 in FIG. 28 in the case where the output current $i_o$ is negative in the circuit of FIG. 10.
Figure 16:
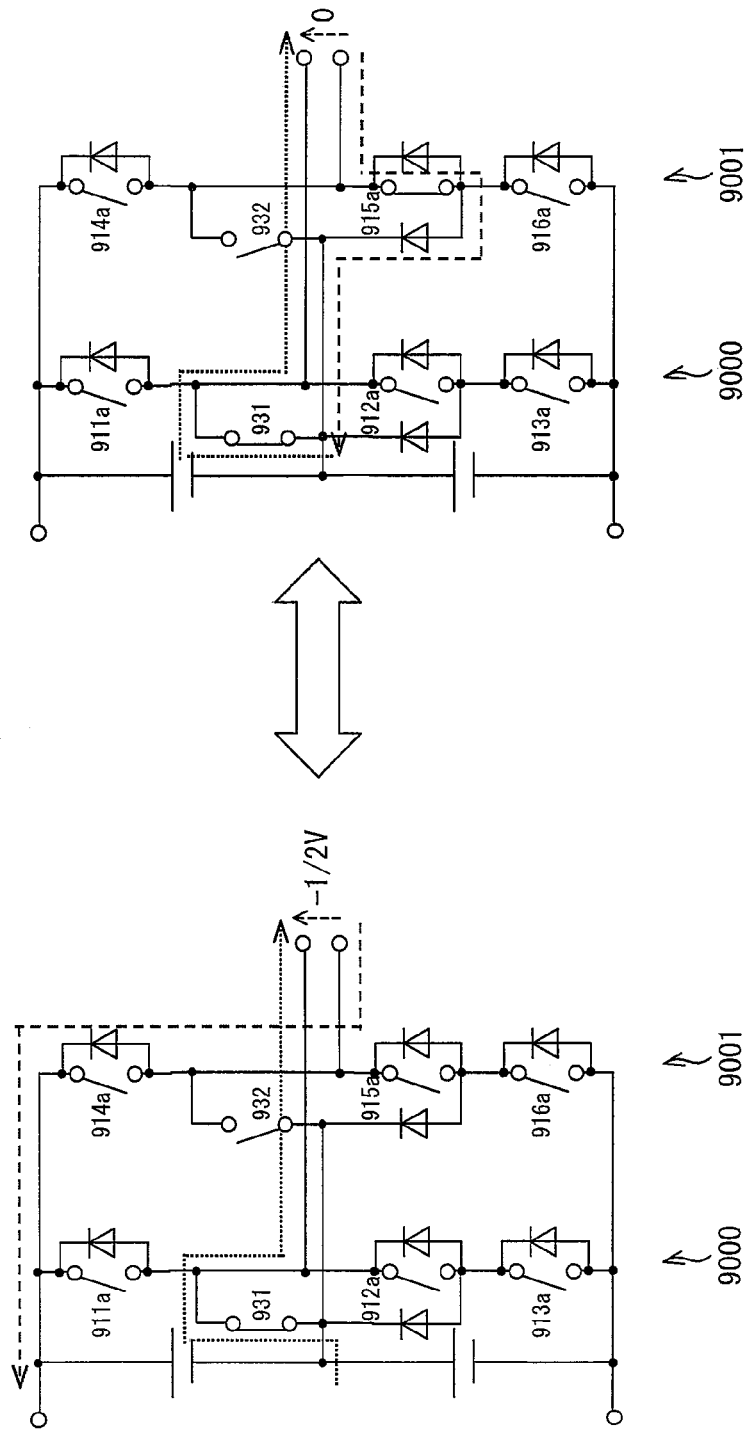
FIG. 16 is a circuit diagram illustrating a state in which the switching elements turn on/off during the time periods (i) from t4 to t5 and (ii) from t6 to t7 in FIG. 28 in the case where the output current $i_o$ is positive in the circuit of FIG. 10.
Figure 17:
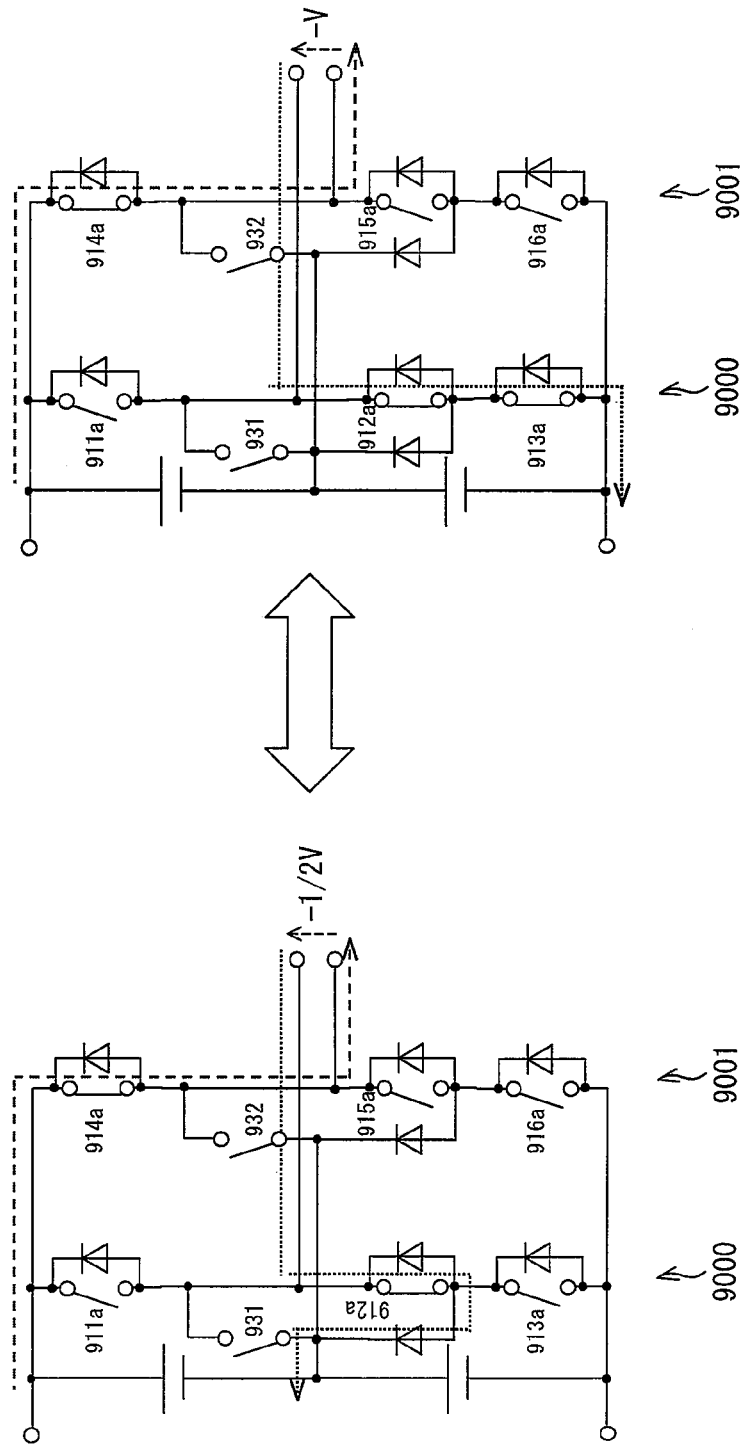
FIG. 17 is a circuit diagram illustrating a state in which the switching elements turn on/off during the time period from t5 to t6 in FIG. 28 in the case where the output current $i_o$ is negative in the circuit of FIG. 10.
Figure 18:
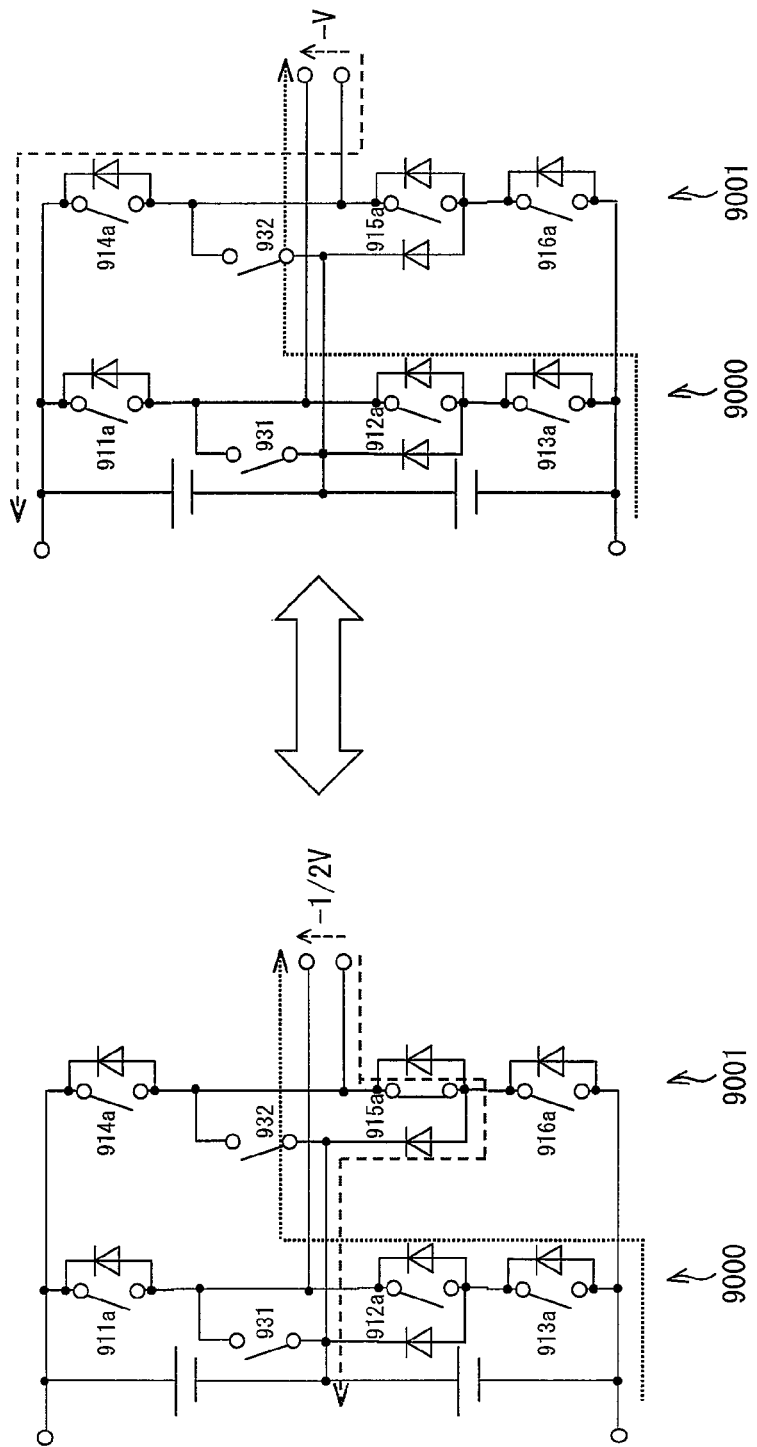
FIG. 18 is a circuit diagram illustrating a state in which the switching elements turn on/off during the time period from t5 to t6 in FIG. 28 in the case where the output current $i_o$ is positive in the circuit of FIG. 10.

The following description specifically discusses FIGS. 11 through 18. FIG. 11 is a circuit diagram illustrating the state in which switching elements turn on/off during the time periods (i) from t1 to t2 and (ii) from t3 to t4 in FIG. 28 in a case where an output current $i_o$ is positive in the circuit of FIG. 10. FIG. 12 is a circuit diagram illustrating the state in which the switching elements turn on/off during the time periods (i) from t1 to t2 and (ii) from t3 to t4 in FIG. 28 in a case where the output current $i_o$ is negative in the circuit of FIG. 10. FIG. 13 is a circuit diagram illustrating the state in which the switching elements turn on/off during the time period from t2 to t3 in FIG. 28 in the case where the output current $i_o$ is positive in the circuit of FIG. 10. FIG. 14 is a circuit diagram illustrating the state in which the switching elements turn on/off during the time period from t2 to t3 in FIG. 28 in the case where the output current $i_o$ is negative in the circuit of FIG. 10. FIG. 15 is a circuit diagram illustrating the state in which the switching elements turn on/off during the time periods (i) from t4 to t5 and (ii) from t6 to t7 in FIG. 28 in the case where the output current $i_o$ is negative in the circuit of FIG. 10. FIG. 16 is a circuit diagram illustrating the state in which the switching elements turn on/off during the time periods (i) from t4 to t5 and (ii) from t6 to t7 in FIG. 28 in the case where the output current $i_o$ is positive in the circuit of FIG. 10. FIG. 17 is a circuit diagram illustrating the state in which the switching elements turn on/off during the time period from t5 to t6 in FIG. 28 in the case where the output current $i_o$ is negative in the circuit of FIG. 10. FIG. 18 is a circuit diagram illustrating the state in which the switching elements turn on/off during the time period from t5 to t6 in FIG. 28 in the case where the output current $i_o$ is positive in the circuit of FIG. 10.

First, in the case where the output current $i_o$ is positive during the time periods (i) from t 1 to t2 and (ii) from t3 to t4 in FIG. 28, the inverter arm 9000 of U phase causes (i) the switching element 911a to turn on, (ii) the switching element 912a to turn off, (iii) the switching element 913a to turn off, and (iv) the switching element 931 to turn off. In contrast, the inverter arm 9001 of W phase causes (i) the switching element 914a to turn off, (ii) the switching element 916a to turn off, and (iii) the switching element 932 to turn off. The inverter arm 9001 of W phase carries out PWM control with respect to the switching element 915a.

Such switching control causes the state illustrated in FIG. 11 to repeatedly occur. Accordingly, in the state in which the output current $i_o$ is positive, the line voltage $v_{uw}$ has the waveform shown in the time periods (i) from t1 to t2 and (ii) from t3 to t4 in FIG. 28. The diode 914b, which is connected to the 914a in an opposite polarity and in parallel, turns on when the line voltage $v_{uw}$ is 0 (zero).

In contrast, in the case where the output current $i_o$ is negative during the time periods (i) from t1 to t2 and (ii) from t3 to t4 in FIG. 28, the inverter arm 9000 of U phase causes (i) the switching element 911a to turn off, (ii) the switching element 913a to turn off, and (iii) the switching element 931 to turn off. The inverter arm 9000 of U phase carries out PWM control with respect to the switching element 912a. In contrast, the inverter arm 9001 of W phase causes (i) the switching element 914a to turn off, (ii) the switching element 915a to turn off, (iii) the switching element 916a to turn off, and (iv) the switching element 932 to turn on.

Such switching control causes the state illustrated in FIG. 12 to repeatedly occur. Accordingly, in the state in which the output current $i_o$ is negative, the line voltage $v_{uw}$ has the waveform shown in the time periods (i) from t1 to t2 and (ii) from t3 to t4 in FIG. 28. The diode 911b, which is connected to the switching element 911a in an opposite polarity and in parallel, turns on when the line voltage $v_{uw}$ is ½V.

Next, in the case where the output current $i_o$ is positive during the time period from t2 to t3 in FIG. 28, the inverter arm 9000 of U phase causes (i) the switching element 911a to turn on, (ii) the switching element 912a to turn off, (iii) the switching element 913a to turn off, and (iv) the switching element 931 to turn off. In contrast, the inverter arm 9001 of W phase causes (i) the switching element 914a to turn off, (ii) the switching element 915a to turn on, and (iii) the switching element 932 to turn off. The inverter arm 9001 of W phase carries out PWM control with respect to the switching element 916a.

Such switching control causes the state illustrated in FIG. 13 to repeatedly occur. Accordingly, in the state in which the output current $i_o$ is positive, the line voltage $v_{uw}$ has the waveform shown in the time period from t2 to t3 in FIG. 28.

In contrast, in the case where the output current $i_o$ is negative during the time period from t2 to t3 in FIG. 28, the inverter arm 9000 of U phase causes (i) the switching element 911a to turn off, (ii) the switching element 913a to turn off, and (iii) the switching element 931 to turn off. The inverter arm 9000 of U phase carries out PWM control with respect to the switching element 912a. In contrast, the inverter arm 9001 of W phase causes (i) the switching element 914a to turn off, (ii) the switching element 915a to turn off, (iii) the switching element 916a to turn off, and (iv) the switching element 932 to turn off.

Such switching control causes the state illustrated in FIG. 14 to repeatedly occur. Accordingly, in the state in which the output current $i_o$ is negative, the line voltage $v_{uw}$ has the waveform shown in the time period from t2 to t3 in FIG. 28. The diodes 915b and 916b, which are connected to the respective switching elements 915a and 916a in an opposite polarity and in parallel, turn on in the state illustrated in FIG. 14. The diode 911b, which is connected to the switching element 911a in an opposite polarity and in parallel, turns on when the line voltage $v_{uw}$ is V.

Subsequently, in the case where the output current $i_o$ is negative during the time periods (i) from t4 to t5 and (ii) from t6 to t7 in FIG. 28, the inverter arm 9000 of U phase causes (i) the switching element 911a to turn off, (ii) the switching element 913a to turn off, and (iii) the switching element 931 to turn off. The inverter arm 9000 of U phase carries out PWM control with respect to the switching element 912a. In contrast, the inverter arm 9001 of W phase causes (i) the switching element 914a to turn on, (ii) the switching element 915a to turn off, (iii) the switching element 916a to turn off, and (iv) the switching element 932 to turn off.

Such switching control causes the state illustrated in FIG. 15 to repeatedly occur. Accordingly, in the state in which the output current $i_o$ is negative, the line voltage $v_{uw}$ has the waveform shown in the time periods (i) from t4 to t5 and (ii) from t6 to t7 in FIG. 28. The diode 911b, which is connected to the switching element 911a in an opposite polarity and in parallel, turns on when the line voltage $v_{uw}$ is 0 (zero).

In contrast, in the case where the output current $i_o$ is positive during the time periods (i) from t4 to t5 and (ii) from t6 to t7 in FIG. 28, the inverter arm 9000 of U phase causes (i) the switching element 911a to turn off, (ii) the switching element 912a to turn off, (iii) the switching element 913a to turn off, and (iv) the switching element 931 to turn on. In contrast, the inverter arm 9001 of W phase causes (i) the switching element 914a to turn off, (ii) the switching element 916a to turn off, and (iii) the switching element 932 to turn off. The inverter arm 9001 of W phase carries out PWM control with respect to the switching element 915a.

Such switching control causes the state illustrated in FIG. 16 to repeatedly occur. Accordingly, in the state in which the output current $i_p$ is positive, the line voltage $v_{uw}$ has the waveform shown in the time periods (i) from t4 to t5 and (ii) from t6 to t7 in FIG. 28. The diode 914b, which is connected to the switching element 914a in an opposite polarity and in parallel, turns on when the line voltage $v_{uw}$ is -½V.

Then, in the case where the output current $i_o$ is negative during the time period from t5 to t6 in FIG. 28, the inverter arm 9000 of U phase causes (i) the switching element 911a to turn off, (ii) the switching element 912a to turn on, and (iii) the switching element 931 to turn off. The inverter arm 9000 of U phase carries out PWM control with respect to the switching element 913a. In contrast, the inverter arm 9001 of W phase causes (i) the switching element 914a to turn on, (ii)

the switching element 915a to turn off, (iii) the switching element 916a to turn off, and (iv) the switching element 932 to turn off.

Such switching control causes the state illustrated in FIG. 17 to repeatedly occur. Accordingly, in the state in which the output current $i_o$ is negative, the line voltage $v_{uw}$ has the waveform shown in the time period from t5 to t6 in FIG. 28.

In contrast, in the case where the output current $i_o$ is positive during the time period from t5 to t6 in FIG. 28, the inverter arm 9000 of U phase causes (i) the switching element 911a to turn off, (ii) the switching element 912a to turn off, (iii) the switching element 913a to turn off, and (iv) the switching element 931 to turn off. In contrast, the inverter arm 9001 of W phase causes (i) the switching element 914a to turn off, (ii) the switching element 916a to turn off, and (iii) the switching element 932 to turn off. The inverter arm 9001 of W phase carries out PWM control with respect to the switching element 915a.

Such switching control causes the state illustrated in FIG. 18 to repeatedly occur. Accordingly, in the state in which the output current $i_o$ is positive, the line voltage $v_{uw}$ has the waveform shown in the time period from t5 to t6 in FIG. 28. The diodes 912b and 913b, which are connected to the respective switching elements 912a and 913a in an opposite polarity and in parallel, turn on in the state illustrated in FIG. 18. The diode 914b, which is connected to the switching element 914a in an opposite polarity and in parallel, turns on when the line voltage $v_{uw}$ is –V.

The multilevel inverter 2 of FIG. 10 thus controls one (1) period from t1 to t7. When finishing control of the one period, the multilevel inverter 2 restarts controlling the one period at t1.

As described earlier, according to the multilevel inverter 2 in accordance with the second embodiment of the present invention, the switching elements of the inverter arm 9000 are suitably controlled to turn on/off. This allows any one of (i) a direct current voltage applied to the highest electric potential point, (ii) a direct current voltage applied to the lowest electric potential point, and (iii) a direct current voltage applied to the power supply connection point to be supplied to the U phase output terminal 906. The switching elements of the inverter arm 9001 are also suitably controlled to turn on/off. This allows any one of (i) the direct current voltage applied to the highest electric potential point, (ii) the direct current voltage applied to the lowest electric potential point, and (iii) the direct current voltage applied to the power supply connection point to be supplied to the W phase output terminal 907. This allows the line voltage $v_{uw}$ to be outputted.

The multilevel inverter 2 can further include a control circuit 50 (control means). The control circuit supplies signals to the respective switching elements 914a, 915a, and 916a, and 911a, 912a, and 913a, the signals controlling the respective switching elements 914a, 915a, and 916a, and 911a, 912a, and 913a to turn on/off. The switching elements 914a, 915a and 916a belong to a first switching element group. The switching elements 911a, 912a, and 913a belong to a second switching element group. The control circuit 50 can carry out switching control so as to prevent (i) all the switching elements 914a, 915a, and 916a belonging to the first switching element group from simultaneously turning on and (ii) all the switching elements 911a, 912a, and 913a belonging to the second switching element group from simultaneously turning on. In addition to such control, the control circuit 50 can carry out the switching control as illustrated in FIGS. 11 through 18. Namely, the control circuit 50 can carry out PWM control with respect to either one of (i) any given number of switching elements of the switching elements provided between the lowest electric potential point 903a and the W phase output terminal 907 and (ii) any given number of switching elements of the switching elements provided between the lowest electric potential point 903a and the U phase output terminal 906. Of the other switching elements, the control circuit 50 can control the switching elements provided between the highest electric potential point 901a and each of the W phase output terminal 907 and the U phase output terminal 906 to keep turning on/off. The control circuit 50 can further control (i) the switching elements provided between the highest electric potential point 901a and the W phase output terminal 907, (ii) the switching elements provided between the highest electric potential point 901a and the U phase output terminal 906, (iii) the first switching element 932, and (iv) the second switching element 931. In this case, each of the switching elements is controlled to turn on/off in accordance with a polarity of the output current $i_o$ outputted via the U phase output terminal 906.

This allows a voltage which has been subjected to PWM control to be outputted as the line voltage $v_{uw}$.

Further, the multilevel inverter 2 is usable both for a load which requires the output current $i_o$ to be positive and for a load which requires the output current $i_o$ to be negative.

Modification of Second Embodiment

Figure 19:
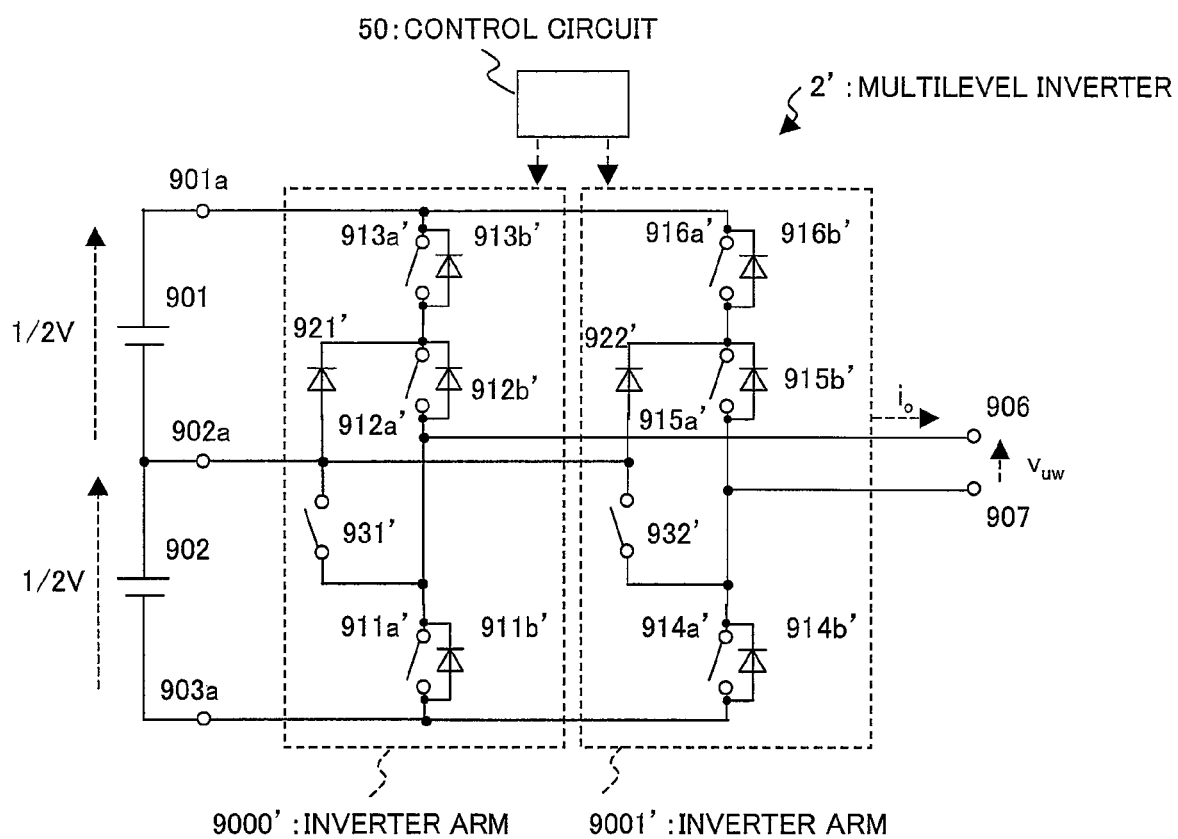
FIG. 19 is a circuit diagram of a multilevel inverter in which high and low sides of respective U phase and W phase inverter arms of the multilevel inverter of FIG. 10 are replaced with each other.

A multilevel inverter 2' of FIG. 19 can be arranged as a modification of the second embodiment of the present invention by replacing, with each other, high and low sides of the respective U phase and W phase inverter arms 9000 and 9001 of the multilevel inverter 2 of FIG. 10. FIG. 19 is a circuit diagram of the multilevel inverter 2'.

In the multilevel inverter 2' of FIG. 19, an inverter arm 9000' of U phase has been obtained by replacing, with each other, the high and low sides of the inverter arm 9000 of U phase of the multilevel inverter 2 of FIG. 10. Similarly, in the multilevel inverter 2' of FIG. 19, an inverter arm 9001' of W phase has been obtained by replacing, with each other, the high and low sides of the inverter arm 9001 of W phase of the multilevel inverter 2 of FIG. 10.

The multilevel inverter 2' in accordance with the modification includes direct current power supplies 901 and 902 which are connected in series, and a U phase output terminal 906 and a W phase output terminal 907 which output a line voltage $v_{uw}$. The multilevel inverter 2' further includes the inverter arm 9001' which supplies, to the W phase output terminal 907, any one of (i) a direct current voltage applied to a highest electric potential point 901a in the direct current power supplies 901 and 902, (ii) a direct current voltage applied to a lowest electric potential point 903a in the direct current power supplies 901 and 902, and (iii) a direct current voltage applied to a power supply connection point 902a at which the direct current power supplies 901 and 902 that are adjacent to each other are connected. The multilevel inverter 2' further includes the inverter arm 9000' which supplies, to the U phase output terminal 906, any one of (i) the direct current voltage applied to the highest electric potential point 901a, (ii) the direct current voltage applied to the lowest electric potential point 903a, and (iii) the direct current voltage applied to the power supply connection point 902a. According to the multilevel inverter 2' having such an arrangement, the inverter arm 9001' is provided between the highest electric potential point 901a and the lowest electric potential point 903a, and includes a first switching element group to which odd-numbered (three in this case) switching elements 914a', 915a' and 916a' belong, the odd-numbered switching elements 914a', 915a' and 916a' being connected in series and connected to respective diodes 914b', 915b', and 916b' which are connected in an opposite polarity and in parallel. The inverter arm 9001' further includes, for each power supply connection point (only the power supply connection point 902a in this case), a diode 922' which has (i) an anode that is connected to the power supply connection point 902a and (ii) a cathode that is connected to the highest electric potential point 901a via the switching element 916a' which belongs to the first switching element group and is equal in number (one (1) in this case) to the direct current power supply 901 which is provided between the highest electric potential point 901a and the power supply connection point 902a. The inverter arm 9001' further includes, for the each power supply connection point (only the power supply connection point 902a in this case), a switching element 932' (a first switching element) which has (i) one end that is connected to the power supply connection point 902a and (ii) the other end that is connected to the lowest electric potential point 903a via the switching element 914a' which belongs to the first switching element group and is equal in number (one (1) in this case) to the direct current power supply 902 which is provided between the lowest electric potential point 903a and the power supply connection point 902a. Further, the W phase output terminal 907 and one of connection points at which the switching elements belonging to the first switching element group are connected to each other are connected, the one connection point (in this case, the connection point at which the switching elements 914a' and 915a' are connected) being located such that one more switching element is provided between the one connection point and the highest electric potential point 901a than between the one connection point and the lowest electric potential point 903a. The inverter arm 9000' is provided between the highest electric potential point 901a and the lowest electric potential point 903a, and includes a second switching element group to which odd-numbered (three in this case) switching elements 911a', 912a' and 913a' belong, the odd-numbered switching elements 911a', 912a' and 913a' being connected in series and connected to respective diodes 911b', 912b', and 913b' which are connected in an opposite polarity and in parallel. The inverter arm 9000' further includes, for each power supply connection point (only the power supply connection point 902a in this case), a diode 921' which has (i) an anode that is connected to the power supply connection point 902a and (ii) a cathode that is connected to the highest electric potential point 901a via the switching element 913a' which belongs to the second switching element group and is equal in number (one (1) in this case) to the direct current power supply 901 which is provided between the highest electric potential point 901a and the power supply connection point 902a. The inverter arm 9000' further includes, for the each power supply connection point (only the power supply connection point 902a in this case), a switching element 931' (a second switching element) which has (i) one end that is connected to the power supply connection point 902a and (ii) the other end that is connected to the lowest electric potential point 903a via the switching element 911a' which belongs to the second switching element group and is equal in number (one (1) in this case) to the direct current power supply 902 which is provided between the lowest electric potential point 903a and the power supply connection point 902a. Further, the U phase output terminal 906 and one of connection points at which the switching elements belonging to the second switching element group are connected to each other are connected, the one connection point (in this case, the connection point at which the switching elements 911a' and 912a' are connected) being located such that one more switching element is provided between the one connection point and the highest electric potential point 901a than between the one connection point and the lowest electric potential point 903a.

According to the arrangement, the switching elements of the inverter arm 9000' can be suitably controlled to turn on/off. This allows any one of (i) the direct current voltage applied to the highest electric potential point 901a, (ii) the direct current voltage applied to the lowest electric potential point 903a, and (iii) the direct current voltage applied to the power supply connection point 902a to be supplied to the U phase output terminal 906. The switching elements of the inverter arm 9001' can be suitably controlled to turn on/off. This allows any one of (i) the direct current voltage applied to the highest electric potential point 901a, (ii) the direct current voltage applied to the lowest electric potential point 903a, and (iii) the direct current voltage applied to the power supply connection point 902a to be supplied to the W phase output terminal 907. This allows the line voltage $v_{uw}$ to be outputted.

For example, assume that a negative output current $i_o$ is outputted via the U phase output terminal 906 and the U phase output terminal 906 has a voltage (the line voltage $v_{uw}$) of −V when a voltage of the W phase output terminal 907 is a reference voltage. In this case, it is only necessary that (i) both the switching elements 915a' and 916a' which are provided between the highest electric potential point 901a and the W phase output terminal 907 turn on and (ii) the switching element 911a' which is provided between the lowest electric potential point 903a and the U phase output terminal 906 turn on.

Alternatively, for example, assume that the negative output current $i_o$ is outputted via the U phase output terminal 906 and the U phase output terminal 906 has the voltage (the line voltage $v_{uw}$) of V when a voltage of the W phase output terminal 907 is a reference voltage. In this case, it is only necessary that (i) the switching element 914a' which is provided between the lowest electric potential point 903a and the W phase output terminal 907 turn off and (ii) both the switching elements 912a' and 913a' which are provided between the highest electric potential point 901a and the U phase output terminal 906 turn off. In this case, a current is supplied to each of (i) the diode 914b' which is provided between the lowest electric potential point 903a and the W phase output terminal 907 and connected to the switching element 914a' in an opposite polarity and in parallel and (ii) the diodes 912b' and 913b' which are provided between the highest electric potential point 901a and the U phase output terminal 906 and connected to the respective switching elements 912a' and 913a' in an opposite polarity and in parallel. This allows the negative output current $i_o$ to be outputted via the U phase output terminal 906.

In the multilevel inverter 2', four diodes have been reduced as compared to the conventional single phase three level inverter of FIG. 27.

This makes it possible to provide a multilevel (single phase three level) inverter in which at least one of (i) the number of switching elements, (ii) the number of diodes, and (iii) the number of floating power supplies has been reduced as compared to the conventional single phase three level inverter.

Extended Modification of Second Embodiment

Figure 20:
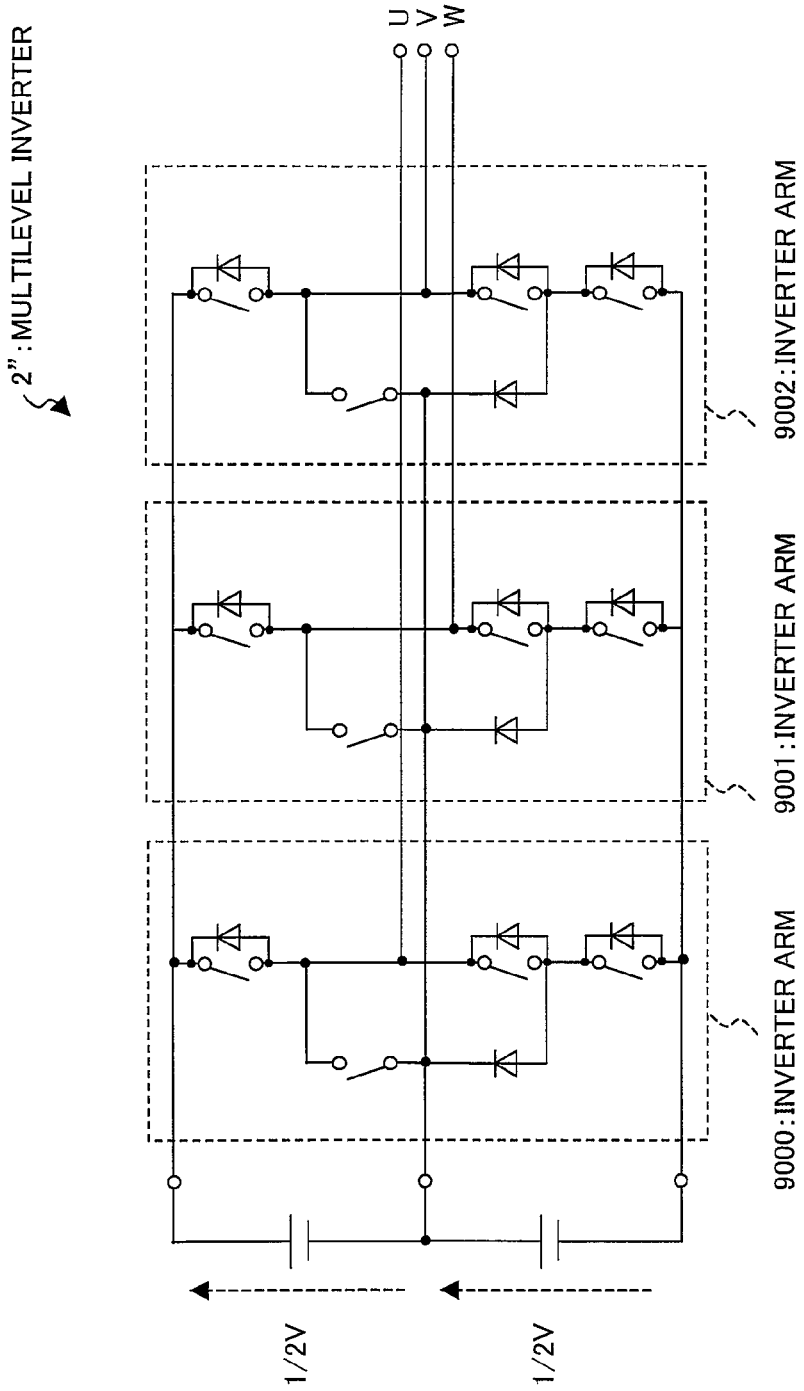
FIG. 20 is a circuit diagram of a three phase three level inverter obtained by adding, to the multilevel inverter of FIG. 10, a V phase inverter arm which has a configuration identical to those of the U phase and W phase inverter arms

A three phase three level inverter 2" can be arranged as an extended modification of the second embodiment by adding, to the multilevel inverter 2 of FIG. 10, a inverter arm 9002 of V phase which has a configuration identical to those of the inverter arm 9000 of U phase and the inverter arm 9001 W phase. FIG. 20 is a circuit diagram of the three phase three level inverter 2".

Note that the inverter arms 9000 and 9001 have an identical configuration according to the multilevel inverter 2 and the other inverter arms 9000' and 9001' have an identical arrangement according to the multilevel inverter 2'. Note here that a multilevel inverter cannot be arranged by, for example, combining the inverter arms 9000 and 9001'. This is because of the following reason. In a case where an output voltage $v_{uw}$ is positive and a multilevel output is produced in one of the inverter arms 9000 and 9001', an output voltage $v_{uw}$ is negative and a two level output is produced in the other of the inverter arms 9000 and 9001'. In contrast, in a case where an output voltage $v_{uw}$ is negative and a multilevel output is produced in one of the inverter arms 9000 and 9001', an output voltage $v_{uw}$ is positive and a two level output is produced in the other of the inverter arms 9000 and 9001'.

[Switching Element]

A semiconductor switch is usable as each of the switching elements of the first and second embodiments. Each of the multilevel inverters 1, 2, and 2' can be arranged by use of the semiconductor switch but without using a mechanical switch.

However, for example, a semiconductor switch such as a MOSFET (metal-oxide-semiconductor field-effect transistor) having a parasitic antiparallel diode is not usable as each of the switching elements 931 and 932 of FIG. 10.

In contrast, a semiconductor switch such as a MOSFET (described above) having a parasitic antiparallel diode is usable as each of (i) the switching elements 611a, 612a, 613a, 614a, 615a, and 616a of FIG. 1 and (ii) the switching elements 911a, 912a, 913a, 914a, 915a, and 916a of FIG. 10. This allows omission of (i) the diodes 611b, 612b, 613b, 614b, 615b, and 616b of FIG. 1 and (ii) the switching elements 911b, 912b, 913b, 914b, 915b, and 916b of FIG. 10.

Figure 21:
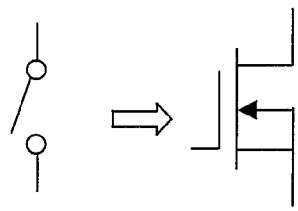
FIG. 21 illustrates a case in which MOSFETs are used as the switching elements in the first and second embodiments of the present invention.

In a case where a MOSFET is used as a switching element, it is only necessary that a MOSFET having a polarity illustrated in FIG. 21 be provided for each of (i) the switching elements 611a, 612a, 613a, 614a, 615a, and 616a of FIG. 1 and (ii) the switching elements 911a, 912a, 913a, 914a, 915a, and 916a of FIG. 10.

Figure 22:
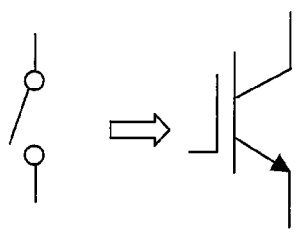
FIG. 22 illustrates a case in which IGBTs are used as the switching elements in the first and second embodiments of the present invention.

In a case where an IGBT (Insulated Gate Bipolar Transistor) is used as a switching element, it is only necessary that an IGBT having a polarity illustrated in FIG. 22 be provided for each of (i) the switching elements 611a, 612a, 613a, 614a, 615a, and 616a of FIG. 1 and (ii) the switching elements 911a, 912a, 913a, 914a, 915a, and 916a of FIG. 10.

[Number of Levels of Multilevel Inverter]

Figure 24:
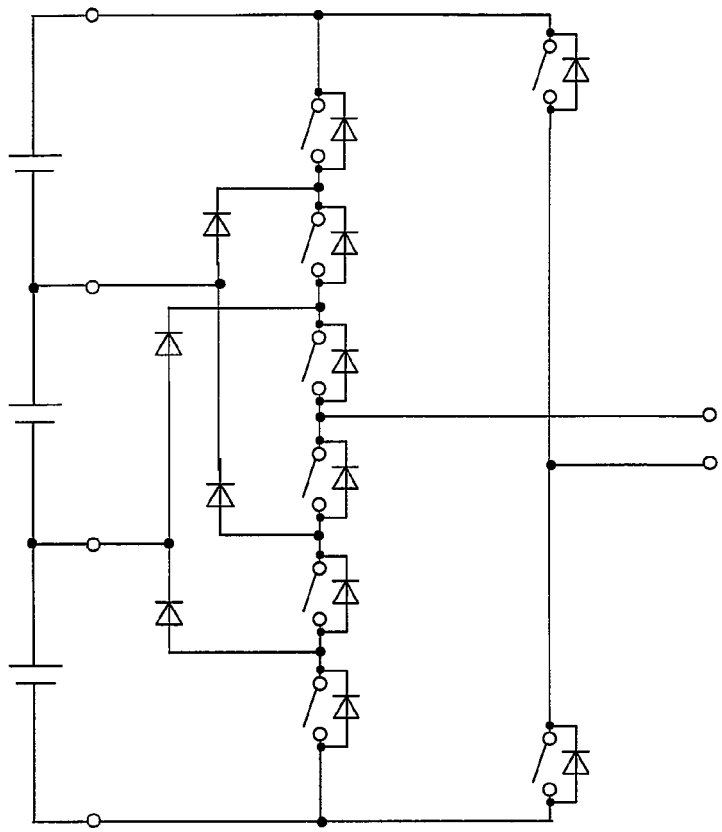
FIG. 24 is a circuit diagram of a four level inverter in accordance with the embodiments of the present invention.
Figure 25:
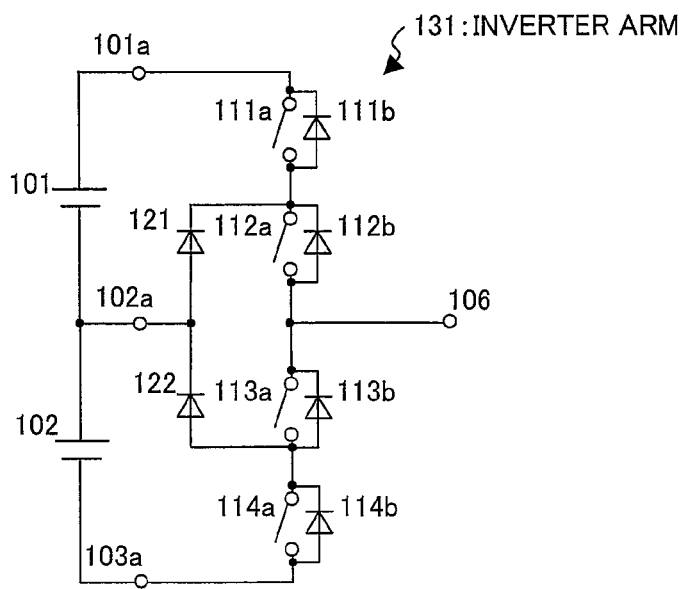
FIG. 25 is a circuit diagram illustrating a configuration of one phase (a U phase) of a conventional single phase three level inverter.
Figure 26:
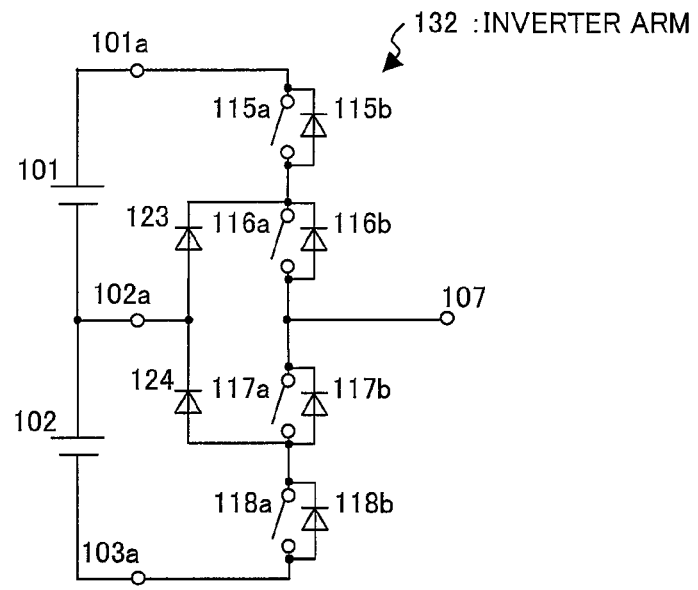
FIG. 26 is a circuit diagram illustrating a configuration of the other phase (a W phase) of the conventional single phase three level inverter.

The embodiments of the present invention discussed a three level inverter. However, the present invention is not limited to this, and is applicable to a multilevel inverter of various levels of four level, five level, . . . . For example, FIG. 24 is a circuit diagram illustrating a four level inverter in accordance with the embodiments of the present invention.

Note that the embodiments of the present invention mainly discussed a utility interactive inverter. However, the present invention is applicable not only to a utility interactive inverter but also to an inverter for a motor drive.

The multilevel inverter can be arranged to further include control means for supplying signals to the respective switching elements belong to the first and second switching element groups, the signals controlling the respective switching elements belong to the first and second switching element groups. The control means can carry out switching control so as to prevent (i) all the switching elements belonging to the first switching element group from simultaneously turning on and (ii) all the switching elements belonging to the second switching element group from simultaneously turning on. In addition to such switching control, of the switching elements belonging to the second switching element group, the control means can (i) carry out PWM control with respect to any given number of switching elements and (ii) control the other switching elements to keep turning on/off. The control means can further control any one of the switching elements belonging to the first switching element group to turn on/off in accordance with a polarity of an output current outputted via the second output terminal.

This allows a voltage which has been subjected to PWM control to be outputted as the alternating current voltage.

Further, the multilevel inverter is usable both for a load which requires the output current to be positive and for a load which requires the output current to be negative.

According to the multilevel inverter, each of (i) the switching elements belonging to the first switching element group and (ii) the switching elements belonging to the second switching element group can be a semiconductor switch.

According to this, the multilevel inverter can be arranged without using a mechanical switch.

Any one of the multilevel inverters can further include control means. The control means supplies signals to the respective switching elements, the signals controlling the respective switching elements. The control means can control (i) the switching elements belonging to the first switching element group, (ii) the switching elements belonging to the second switching element group, (iii) the first switching element, and (iv) the second switching element. The control means can carry out switching control so as to prevent (i) all the switching elements belonging to the first switching element group from simultaneously turning on and (ii) all the switching elements belonging to the second switching element group from simultaneously turning on. In addition to such switching control, the control means can carry out PWM control with respect to either one of (i) any given number of switching elements of the switching elements provided between the lowest electric potential point or the highest electric potential point and the first output terminal and (ii) any given number of switching elements of the switching elements provided between the lowest electric potential point or the highest electric potential point and the second output terminal. The control means can control a switching element of the other switching elements which is provided between the highest electric potential point or the lowest electric potential point and each of the first and second output terminals to keep turning on/off. The control means can further control each of (i) the switching elements provided between the highest electric potential point or the lowest electric potential point and the first output terminal, (ii) the switching elements provided between the highest electric potential point or the lowest electric potential point and the second output terminal, (iii) the first switching element, and (iv) the second switching element to turn on/off in accordance with a polarity of the output current outputted via the second output terminal.

This allows a voltage which has been subjected to PWM control to be outputted as the alternating current voltage.

Further, the multilevel inverter is usable both for a load which requires the output current to be positive and for a load which requires the output current to be negative.

According to any one of the multilevel inverters, each of (i) the switching elements belonging to the first switching element group, (ii) the switching elements belonging to the second switching element group, (iii) the first switching element, and (iv) the second switching element can be a semiconductor switch.

According to this, the multilevel inverter can be arranged without using a mechanical switch.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

Since a multilevel inverter of the present invention allows a reduction in at least one of (i) the number of switching elements, (ii) the number of diodes, and (iii) the number of floating power supplies has been reduced as compared to a conventional multilevel inverter, the present invention is suitably usable for a multilevel inverter which is required to have a smaller circuit and to be made at a lower cost.

REFERENCE SIGNS LIST 1, 2, 2' Multilevel Inverter
2" Three phase three level inverter
6000 Inverter arm (Second inverter arm)
6001 Inverter arm (First inverter arm)
6000' Inverter arm
601, 602 Direct current power supply (A plurality of direct current power supplies)
601a-603a Direct current voltage terminal
606 U phase output terminal (Second output terminal)
607 W phase output terminal (First output terminal)
611a, 612a, 613a, 614a Switching element (Second switching element group)
615a, 616a Switching element (First switching element group)
611b, 612b, 613b, 614b Diode
615b, 616b Diode
621 Diode
622 Diode
9000, 9000' Inverter arm (Second inverter arm)
9001, 9001' Inverter arm (First inverter arm)
9002 Inverter arm
901, 902 Direct current power supply (A plurality of direct current power supplies)
901a-903a Direct current voltage terminal
906 U phase output terminal (Second output terminal)
907 W phase output terminal (First output terminal)
911a, 912a, 913a Switching element (Second switching element group)
911a', 912a', 913a' Switching element (Second switching element group)
914a, 915a, 916a Switching element (First switching element group)
914a', 915a', 916a' Switching element (First switching element group)
931, 931' Switching element (Second switching element)
932, 932' Switching element (First switching element)
911b, 912b, 913b Diode
911b', 912b', 913b' Diode
914b, 915b, 916b Diode
914b', 915b', 916b' Diode
921, 921' Diode
922, 922' Diode
50 Control circuit (Control means)
$i_o$ Output current
$v_{uw}$ Line voltage (Alternating current voltage)

The invention claimed is:

1. A multilevel inverter comprising:
a plurality of direct current power supplies which are connected in series;
a first output terminal and a second output terminal which output an alternating current voltage;
a first inverter arm which supplies, to the first output terminal, any one of (i) a direct current voltage applied to a highest electric potential point in the plurality of direct current power supplies, (ii) a direct current voltage applied to a lowest electric potential point in the plurality of direct current power supplies, and (iii) a direct current voltage applied to each power supply connection point at which the plurality of direct current power supplies that are adjacent to each other are connected; and
a second inverter arm which supplies, to the second output terminal, any one of (i) the direct current voltage applied to the highest electric potential point, (ii) the direct current voltage applied to the lowest electric potential point, and (iii) the direct current voltage applied to the each power supply connection point,
the first inverter arm including a first switching element group to which odd-numbered switching elements belong, the odd-numbered switching elements being (i) connected in series, (ii) provided between the highest electric potential point and the lowest electric potential point, and (iii) connected to respective diodes which are connected in an opposite polarity and in parallel,
the first inverter arm further including a third switching element and a first diode for the each power supply connection point,
the third switching element having (i) one end which is connected to the each power supply connection point and (ii) the other end which is connected to the highest electric potential point via at least one of the odd-numbered switching elements belonging to the first switching element group, the at least one switching element being equal in number to at least one of the plurality of direct current power supplies, the at least one direct current power supply being provided between the highest electric potential point and the each power supply connection point,
the first diode having (i) a cathode which is connected to the each power supply connection point and (ii) an anode which is connected to the lowest electric potential point via the other switching elements which belong to the first switching element group and are equal in number to the other direct current power supplies, the other direct current power supplies being provided between the lowest electric potential point and the each power supply connection point,
(i) the first output terminal and (ii) one of connection points at which the odd-numbered switching elements belonging to the first switching element group are connected to each other being connected, the one connection point being located such that at least one of the odd-numbered switching elements provided between the one connection point and the highest electric potential point is smaller in number by one than the other switching elements which belong to the first switching element group and are provided between the one connection point and the lowest electric potential point,
the second inverter arm including a second switching element group to which odd-numbered switching elements belong, the odd-numbered switching elements being (i) connected in series, (ii) provided between the highest electric potential point and the lowest electric potential point, and (iii) connected to respective diodes which are connected in an opposite polarity and in parallel, the second inverter arm further including a fourth switching element and a second diode for the each power supply connection point, the fourth switching element having (i) one end which is connected to the each power supply connection point and (ii) the other end which is connected to the highest electric potential point via at least one of the odd-numbered switching elements belonging to the second switching element group, the at least one switching element being equal in number to at least one of the plurality of direct current power supplies, the at least one direct current power supply being provided between the highest electric potential point and the each power supply connection point, the second diode having (i) a cathode which is connected to the each power supply connection point and (ii) an anode which is connected to the lowest electric potential point via the other switching elements which belong to the second switching element group and are equal in number to the other direct current power supplies, the other direct current power supplies being provided between the lowest electric potential point and the each power supply connection point, (i) the second output terminal and (ii) one of connection points at which the odd-numbered switching elements belonging to the second switching element group are connected to each other being connected, the one connection point being located such that at least one of the odd-numbered switching elements provided between the one connection point and the highest electric potential point is smaller in number by one than the other switching elements which belong to the second switching element group and are provided between the one connection point and the lowest electric potential point.

2. A multilevel inverter comprising:

a plurality of direct current power supplies which are connected in series;

a first output terminal and a second output terminal which output an alternating current voltage;

a first inverter arm which supplies, to the first output terminal, any one of (i) a direct current voltage applied to a highest electric potential point in the plurality of direct current power supplies, (ii) a direct current voltage applied to a lowest electric potential point in the plurality of direct current power supplies, and (iii) a direct current voltage applied to each power supply connection point at which the plurality of direct current power supplies that are adjacent to each other are connected; and a second inverter arm which supplies, to the second output terminal, any one of (i) the direct current voltage applied to the highest electric potential point, (ii) the direct current voltage applied to the lowest electric potential point, and (iii) the direct current voltage applied to the each power supply connection point, the first inverter arm including a first switching element group to which odd-numbered switching elements belong, the odd-numbered switching elements being (i) connected in series, (ii) provided between the highest electric potential point and the lowest electric potential point, and (iii) connected to respective diodes which are connected in an opposite polarity and in parallel, the first inverter arm further including a first diode and a third switching element for the each power supply connection point, the first diode having (i) an anode which is connected to the each power supply connection point and (ii) a cathode which is connected to the highest electric potential point via at least one of the odd-numbered switching elements belonging to the first switching element group, the at least one switching element being equal in number to at least one of the plurality of direct current power supplies, the at least one direct current power supply being provided between the highest electric potential point and the each power supply connection point, the third switching element having (i) one end which is connected to the each power supply connection point and (ii) the other end which is connected to the lowest electric potential point via the other switching elements which belong to the first switching element group and are equal in number to the other direct current power supplies, the other direct current power supplies being provided between the lowest electric potential point and the each power supply connection point, (i) the first output terminal and (ii) one of connection points at which the odd-numbered switching elements belonging to the first switching element group are connected to each other being connected, the one connection point being located such that at least one of the odd-numbered switching elements provided between the one connection point and the highest electric potential point is larger in number by one than the other switching elements which belong to the first switching element group and are provided between the one connection point and the lowest electric potential point, the second inverter arm including a second switching element group to which odd-numbered switching elements belong, the odd-numbered switching elements being (i) connected in series, (ii) provided between the highest electric potential point and the lowest electric potential point, and (iii) connected to respective diodes which are connected in an opposite polarity and in parallel, the second inverter arm further including a second diode and a fourth switching element for the each power supply connection point, the second diode having (i) an anode which is connected to the each power supply connection point and (ii) a cathode which is connected to the highest electric potential point via at least one of the odd-numbered switching elements belonging to the second switching element group, the at least one switching element being equal in number to at least one of the plurality of direct current power supplies, the at least one direct current power supply being provided between the highest electric potential point and the each power supply connection point, the fourth switching element having (i) one end which is connected to the each power supply connection point and (ii) the other end which is connected to the lowest electric potential point via the other switching elements which belong to the second switching element group and are equal in number to the other direct current power supplies, the other direct current power supplies being provided between the lowest electric potential point and the each power supply connection point, (i) the second output terminal and (ii) one of connection points at which the odd-numbered switching elements belonging to the second switching element group are connected to each other being connected, the one connection point being located such that at least one of the odd-numbered switching elements provided between the one connection point and the highest electric potential point is larger in number by one than the other switching elements which belong to the second switching element group and are provided between the one connection point and the lowest electric potential point.

3. The multilevel inverter as set forth in claim 1, further comprising control means for supplying signals to (i) the respective odd-numbered switching elements belonging to the first switching element group, (ii) the respective odd-numbered switching elements belonging to the second switching element group, (iii) the third switching element, and (iv) the fourth switching element, the signals controlling turning on/off of the respective switching elements (i) through (iv), the control means carrying out switching control so that:
(i) all the odd-numbered switching elements belonging to the first switching element group are prevented from simultaneously turning on;
(ii) all the odd-numbered switching elements belonging to the second switching element group are prevented from simultaneously turning on;
(iii) either one of (a) any given number of switching elements of the odd-numbered switching elements provided between the lowest electric potential point or the highest electric potential point and the first output terminal and (b) any given number of switching elements of the odd-numbered switching elements provided between the lowest electric potential point or the highest electric potential point and the second output terminal is selectively subjected to pulse width modulation control, and the switching elements which are other than the any given number of switching elements and are provided between the lowest electric potential point or the highest electric potential point and each of the first output terminal and the second output terminal are kept turning on/off; and
(iv) each of (a) the odd-numbered switching elements provided between the highest electric potential point or the lowest electric potential point and the first output terminal, (b) the odd-numbered switching elements provided between the highest electric potential point or the lowest electric potential point and the second output terminal, (c) the third switching element, and (d) the fourth switching element turns on/off in accordance with a polarity of an output current outputted via the second output terminal.

4. The multilevel inverter as set forth in claim 2, further comprising control means for supplying signals to (i) the respective odd-numbered switching elements belonging to the first switching element group, (ii) the respective odd-numbered switching elements belonging to the second switching element group, (iii) the third switching element, and (iv) the fourth switching element, the signals controlling turning on/off of the respective switching elements (i) through (iv), the control means carrying out switching control so that:
(i) all the odd-numbered switching elements belonging to the first switching element group are prevented from simultaneously turning on;
(ii) all the odd-numbered switching elements belonging to the second switching element group are prevented from simultaneously turning on;
(iii) either one of (a) any given number of switching elements of the odd-numbered switching elements provided between the lowest electric potential point or the highest electric potential point and the first output terminal and (b) any given number of switching elements of the odd-numbered switching elements provided between the lowest electric potential point or the highest electric potential point and the second output terminal is selectively subjected to pulse width modulation control, and the switching elements which are other than the any given number of switching elements and are provided between the lowest electric potential point or the highest electric potential point and each of the first output terminal and the second output terminal are kept turning on/off; and
(iv) each of (a) the odd-numbered switching elements provided between the highest electric potential point or the lowest electric potential point and the first output terminal, (b) the odd-numbered switching elements provided between the highest electric potential point or the lowest electric potential point and the second output terminal, (c) the third switching element, and (d) the fourth switching element turns on/off in accordance with a polarity of an output current outputted via the second output terminal.

5. The multilevel inverter as set forth in claim 1, wherein each of (i) the odd-numbered switching elements belonging to the first switching element group, (ii) the odd-numbered switching elements belonging to the second switching element group, (iii) the third switching element, and (iv) the fourth switching element is a semiconductor switch.

6. The multilevel inverter as set forth in claim 2, wherein each of (i) the odd-numbered switching elements belonging to the first switching element group, (ii) the odd-numbered switching elements belonging to the second switching element group, (iii) the third switching element, and (iv) the fourth switching element is a semiconductor switch.

* * * * *